United States Patent
Fu et al.

(10) Patent No.: US 12,238,734 B2
(45) Date of Patent: Feb. 25, 2025

(54) METHOD AND APPARATUS OF RECEIVING DOWNLINK CONTROL INFORMATION

(71) Applicant: Samsung Electronics Co., Ltd., Suwon-si (KR)

(72) Inventors: Jingxing Fu, Beijing (CN); Feifei Sun, Beijing (CN); Yi Wang, Beijing (CN); Bin Yu, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 462 days.

(21) Appl. No.: 17/607,851

(22) PCT Filed: Apr. 29, 2020

(86) PCT No.: PCT/KR2020/005785
§ 371 (c)(1),
(2) Date: Oct. 29, 2021

(87) PCT Pub. No.: WO2020/222574
PCT Pub. Date: Nov. 5, 2020

(65) Prior Publication Data
US 2022/0217755 A1    Jul. 7, 2022

(30) Foreign Application Priority Data

Apr. 30, 2019 (CN) .......................... 201910364085.4
Nov. 6, 2019 (CN) .......................... 201911077534.3

(51) Int. Cl.
*H04W 72/12* (2023.01)
*H04W 8/24* (2009.01)
*H04W 72/23* (2023.01)

(52) U.S. Cl.
CPC ............. *H04W 72/23* (2023.01); *H04W 8/24* (2013.01)

(58) Field of Classification Search
CPC ................................. H04W 72/23; H04W 8/24
See application file for complete search history.

(56) References Cited

U.S. PATENT DOCUMENTS 10,827,475 B2   11/2020  Wang et al.
11,516,786 B2 *  11/2022  Hwang ................... H04L 5/001
(Continued)

FOREIGN PATENT DOCUMENTS

CN    101883369 A    11/2010
CN    102413576 A    4/2012
(Continued)

OTHER PUBLICATIONS

R1-1905430; Title: On DCI enhancement for NR URLLC; Source: WILUS Inc; Date: Apr. 8-12, 2019 (Year: 2019).*
(Continued)

*Primary Examiner* — Fahmida S Chowdhury

(57) ABSTRACT

The present disclosure relates to a pre-5th-Generation (5G) or 5G communication system to be provided for supporting higher data rates beyond 4th-Generation (4G) communication system such as long term evolution (LTE). The present disclosure provides a method and apparatus of receiving Downlink Control Information (DCI). The method may include: a User Equipment (UE) determines a number of detections corresponding to a DCI detection ability of the UE and a number of detections corresponding to a DCI format; the UE reduces the number of detections corresponding to the DCI format, wherein the reduced number of detections corresponding to the DCI format is smaller than or equal to the number of detections corresponding to the DCI detection ability; and the UE receives the DCI according to the reduced number of detections corresponding to the
(Continued)

DCI format. According to the method and apparatus of the present disclosure, a complexity of a procedure of receiving the DCI can be reduced.

20 Claims, 3 Drawing Sheets

(56) References Cited

U.S. PATENT DOCUMENTS

| | | | | |
|---|---|---|---|---|
| 11,595,997 | B2* | 2/2023 | Moroga | H04L 1/189 |
| 2013/0070703 | A1* | 3/2013 | Yasukawa | H04W 72/20 370/329 |
| 2017/0170940 | A1* | 6/2017 | Lee | H04W 72/0446 |
| 2018/0152954 | A1* | 5/2018 | Golitschek Edler von Elbwart | H04L 5/0092 |
| 2018/0287765 | A1* | 10/2018 | Lee | H04W 24/08 |
| 2019/0053206 | A1 | 2/2019 | Babaei et al. | |
| 2019/0082431 | A1* | 3/2019 | Yi | H04W 72/0446 |
| 2019/0223160 | A1* | 7/2019 | He | H04W 68/005 |
| 2019/0297604 | A1* | 9/2019 | Lee | H04L 5/0053 |
| 2019/0313378 | A1* | 10/2019 | Abdoli | H04W 52/325 |
| 2019/0320457 | A1* | 10/2019 | Maaref | H04W 72/23 |
| 2020/0059904 | A1* | 2/2020 | Takeda | H04L 5/001 |
| 2020/0351837 | A1* | 11/2020 | Hwang | H04L 1/1812 |
| 2021/0058947 | A1* | 2/2021 | Lin | H04W 72/1268 |
| 2022/0124788 | A1* | 4/2022 | Kittichokechai | H04W 72/1263 |

FOREIGN PATENT DOCUMENTS

| | | |
|---|---|---|
| CN | 104469804 A | 3/2015 |
| CN | 107708210 A | 2/2018 |
| CN | 108702770 A | 10/2018 |
| WO | 2017/026086 A1 | 2/2017 |

OTHER PUBLICATIONS

R1-1814248; Title: Correction of DCI size alignment; Source: Ericsson; Date: Nov. 12-17, 2018 (Year: 2018).*
Sharp, "Correction to DCI size alignment procedure in TS 38.212", Draft Change Request, 3GPP TSG-RAN1 Meeting #96, Feb. 25-Mar. 1, 2019, R1-1902649, 5 pages.
Huawei, HiSilicon, "Correction on DCI size alignment in TS 38.212", [Draft] Change Request, 3GPP TSG RAN WG1 Meeting #96bis, Apr. 8-12, 2019, R1-1905248, 8 pages.
"5G; NR; Multiplexing and channel coding (3GPP TS 38.212 version 15.5.0 Release 15)", ETSI TS 138 212 V15.5.0 (May 2019), 104 pages.
LG Electronics, "PDCCH enhancements for NR URLLC", 3GPP TSG RAN WG1 #96bis, Apr. 8-12, 2019, R1-1904627, 4 pages.
International Search Report dated Aug. 25, 2020 in connection with International Patent Application No. PCT/KR2020/005785, 3 pages.
Written Opinion of the International Searching Authority dated Aug. 25, 2020 in connection with International Patent Application No. PCT/KR2020/005785, 4 pages.
Examination Report dated Aug. 4, 2023, in connection with Indian Patent Application No. 202147050058, 6 pages.
Sharp, "Correction to DCI size alignment procedure in TS 38.212," 3GPP TSG-RAN1 Meeting #96 R1-1902649, Athens, Greece, Feb. 25-Mar. 1, 2019, 5 pages.
European Patent Office, "Supplementary European Search Report," dated May 12, 2022, in connection with European Patent Application No. 20798608.4, 8 pages.
WILUS Inc., "On DCI enhancement for NR URLLC," 3GPP TSG RAN WG1 #96bis, R1-1905430, Xi'an, China, Apr. 8-12, 2019, 3 pages.
Ericsson, "Correction of DCI size alignment," 3GPP TSG-RAN1 Meeting #95, R1-1814248, Spokane, WA, US, Nov. 12-17, 2018, 31 pages.
Office Action dated May 30, 2024, in connection with Chinese Patent Application No. 201911077534.3, 16 pages.
Office Action issued Oct. 24, 2024, in connection with Chinese Patent Application No. 201911077534.3, 6 pages.

* cited by examiner

[Fig. 1]
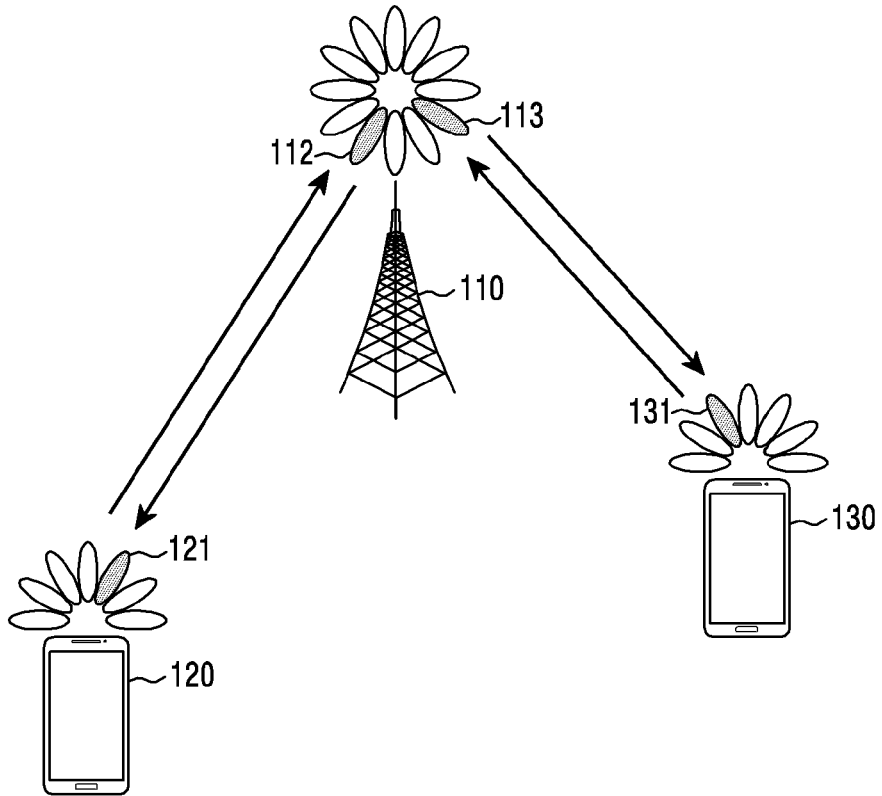
[Fig. 2]
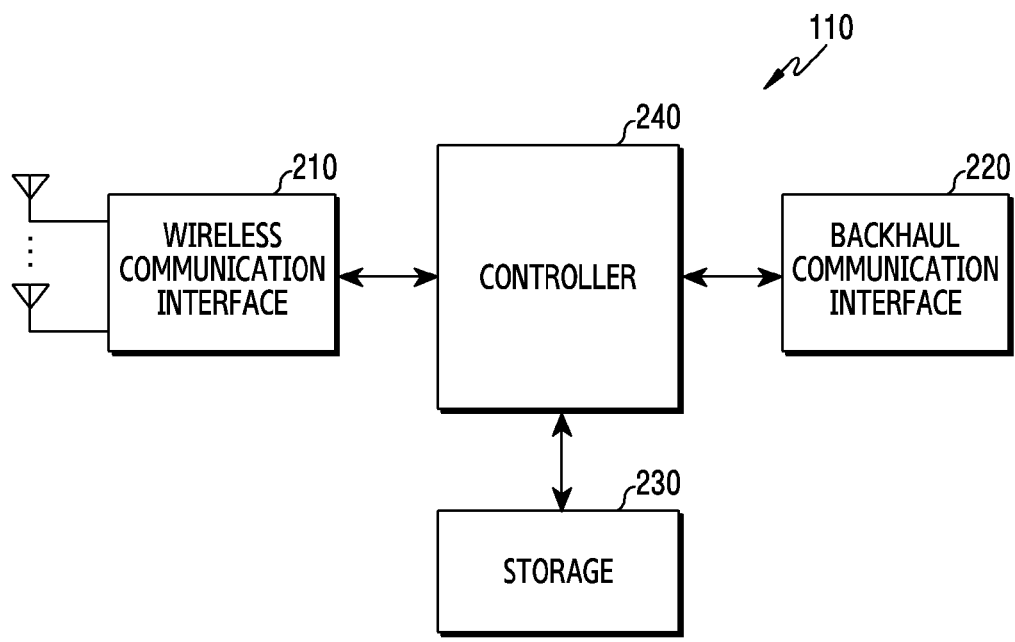

[Fig. 3]
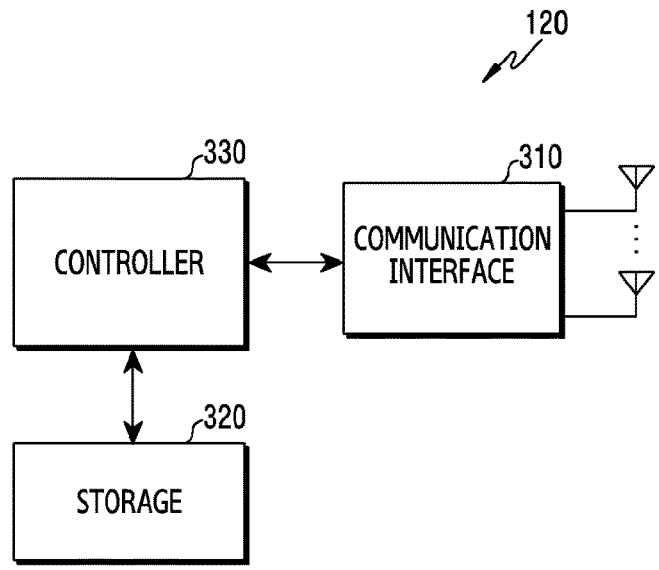
[Fig. 4]
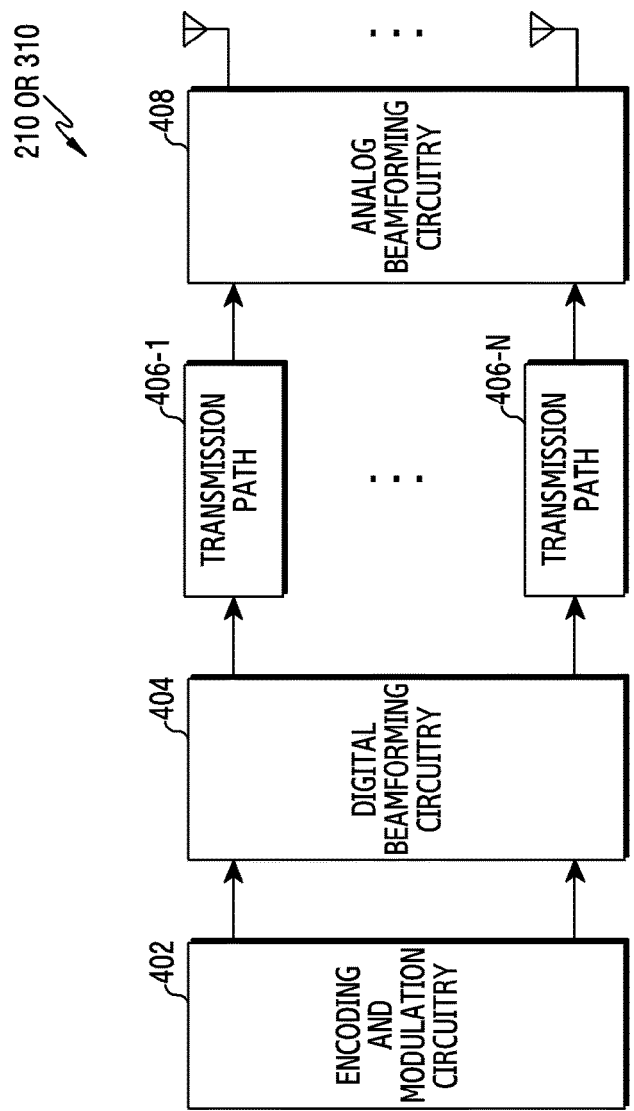

[Fig. 5]
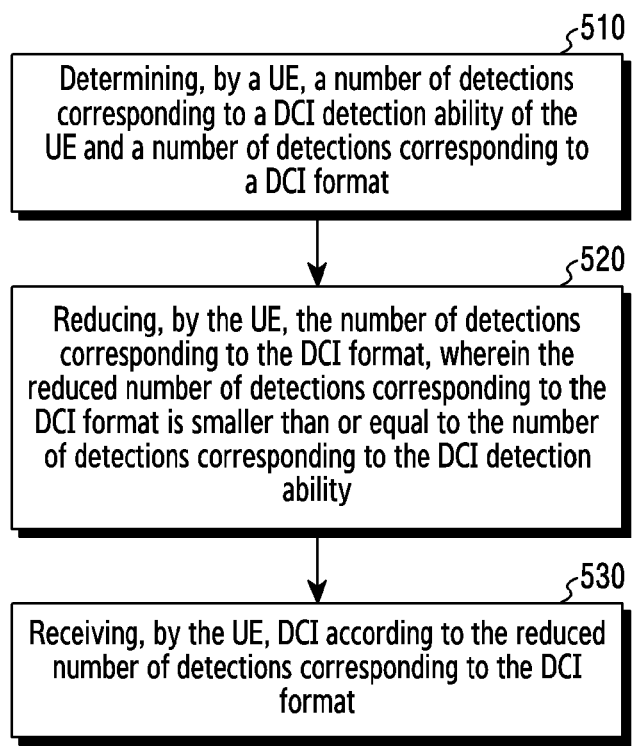
[Fig. 6]
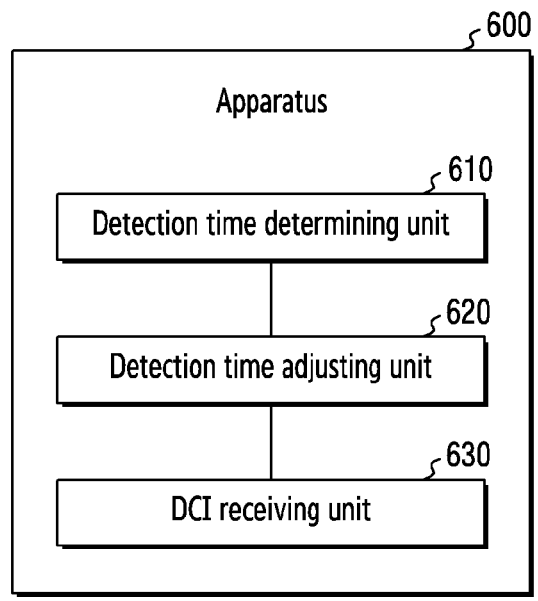

METHOD AND APPARATUS OF RECEIVING DOWNLINK CONTROL INFORMATION

CROSS-REFERENCE TO RELATED APPLICATIONS

This application is a 371 of International Application No. PCT/KR2020/005785 filed on Apr. 29, 2020, which claims priority to Chinese Patent Application No. 201910364085.4 filed on Apr. 30, 2019, and Chinese Patent Application No. 201911077534.3 filed on Nov. 6, 2019, the disclosures of which are herein incorporated by reference in their entirety.

BACKGROUND

1. Field

The present disclosure relates to a technical field of wireless communication. More particularly, this disclosure relates to a method and apparatus of receiving Downlink Control Information (DCI).

2. Description of Related Art

To meet the demand for wireless data traffic having increased since deployment of 4th generation (4G) communication systems, efforts have been made to develop an improved 5th generation (5G) or pre-5G communication system. Therefore, the 5G or pre-5G communication system is also called a 'Beyond 4G Network' or a 'Post Long Term Evolution (LTE) System'.

The 5G communication system is considered to be implemented in higher frequency (mmWave) bands, e.g., 28 GHz or 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

In a Long-term Evolution (LTE) system, transmissions of a Physical Downlink Shared Channel (PDSCH) and a Physical Uplink Shared Channel (PUSCH) are scheduled by Downlink Control Information (DCI) of a Physical Downlink Control Channel (PDCCH). A search space of transmitting the DCI includes a Common Search Space (CSS) and a User Equipment-specific Search Space (US S), wherein, as for the CSS, any User Equipment (UE) can perform demodulating and decoding, while as for the USS, only a specific UE can perform demodulating and decoding. The DCI format may be divided into a DCI format for scheduling the PDSCH (for example, a DCI format 1-0 and a DCI format 1-1) and a DCI format for scheduling the PUSCH (for example, a DCI format 0-0 and a DCI format 0-1); the DCI format may also be divided into a fallback DCI format (for example, a DCI format 0-0 and a DCI format 1-0) and a non-fallback DCI format (for example, a DCI format 0-1 and a DCI format 1-1); a number of information bits (called a number of bits for short) contained (for example, configured or required and the like) in the DCI with different formats may be the same and may also be different, and a number of bits contained (for example, configured or required and the like) in DCI having a specific DCI format can be called a number of bits of the specific DCI format for short.

When the DCI with different DCI formats are used, the numbers of bits that need to be used may be different, for example, a difference among numbers of bits of different DCI formats may be relatively large, so that the difference can be identified, for another example, even if a difference among numbers of bits of different DCI formats is not large, that is, there is a difference among the numbers of bits of different DCI formats, whether the DCI format is a fallback DCI format or a non-fallback DCI format can be determined.

In a procedure of receiving (for example, monitoring) the DCI, complexities of different DCI receiving methods are different, and a complexity can be measured through a number of detections. When the complexity is high, data transmission may be affected, for example, transmission of Ultra Reliability Low Latency Communication (URLLC) data is affected.

SUMMARY

The present disclosure provides a method and apparatus of receiving DCI, a complexity of a procedure of receiving the DCI by an electronic equipment such as a User Equipment (UE) and the like can be reduced, and in particular, an effect on transmission of data such as URLLC data and the like can be reduced.

According to an exemplary embodiment of the present disclosure, there is provided a method of receiving downlink control information (DCI), which includes: determining, by the UE, a number of detections corresponding to a DCI detection ability of the UE and a number of detections corresponding to a DCI format; reducing, by the UE, the number of detections corresponding to the DCI format, wherein the reduced number of detections corresponding to the DCI format is smaller than or equal to the number of detections corresponding to the DCI detection ability; and receiving, by the UE, the DCI according to the reduced number of detections corresponding to the DCI format.

Alternatively, the reducing the number of detections corresponding to the DCI format includes: reducing a number of detected DCI formats with different numbers of bits by changing a number of bits of at least one DCI format, to remove the number of detections corresponding to the DCI format removed by changing the number of bits, and/or, limiting a number of detections of a physical downlink control channel (PDCCH) and a number of detections of a non-overlapped control channel element (CCE).

Alternatively, as for a serving cell that introduces an URLLC service transmission, the reducing the number of the detected DCI formats with different numbers of bits includes at least one step of: enabling a number of bits of a DCI format 0-0 of a CSS and a number of bits of a DCI format 1-0 of the CSS to be the same by increasing or reducing the number of bits of the DCI format; enabling a number of bits of a DCI format 0-0 of a USS and a number of bits of a DCI format 1-0 of the CSS to be the same by increasing or reducing the number of bits of the DCI format; when a number of bits of a DCI format 0-1 of the USS is the same as the number of bits of the DCI format 0-0 of the USS or a number of bits of a DCI format 1-0 of the USS, increasing the number of bits of the DCI format 0-1 of the USS by 1 bit, to enable the number of bits of the DCI format 0-1 of the USS to be different from the number of bits of the DCI format 0-0 of the USS or the number of bits of the DCI format 1-0 of the USS; when a number of bits of a DCI format 1-1 of the USS is the same as the number of bits of the DCI format 0-0 of the USS or the number of bits of the DCI format 1-0 of the USS, increasing the number of bits of the DCI format 1-1 of the USS by 1 bit, to enable the number of bits of the DCI format 1-1 of the USS to be different from the number of bits of the DCI format 0-0 of the USS or the number of bits of the DCI format 1-0 of the USS, wherein when the number of the DCI formats with different number of bits detected in each serving cell by the UE is enabled, through the above step, to be smaller than or equal to M, and a number of the DCI formats with different number of bits scrambled with the C-RNTI detected in the each serving cell by the UE is enabled to be smaller than or equal to N, then the reducing the number of the detected DCI formats with different number of bits is completed, and wherein N≥4, and M≥3.

Alternatively, as for the serving cell that introduces the URLLC service transmission, when the number of the DCI formats with different number of bits detected in each serving cell by the UE is not enabled to be smaller than or equal to M and the number of the DCI formats with different number of bits scrambled with the C-RNTI detected in the each serving cell by the UE is not enabled to be smaller than or equal to N, the following steps are performed in an order of step b, step c, step d, step e, step f and step a, until the number of the DCI formats with different number of bits detected in the each serving cell by the UE is smaller than or equal to M and the number of the DCI formats with different number of bits scrambled with the C-RNTI detected in the each serving cell by the UE is smaller than or equal to N, and wherein N≥4, and M≥3: step a: enabling a number of bits of a DCI format 0-x of the USS and a number of bits of a DCI format 1-x of the USS to be the same by increasing or reducing the number of bits of the DCI format 0-x or the number of bits of the DCI format 1-x; step b: enabling the number of bits of the DCI format 0-1 of the USS and the number of bits of the DCI format 0-x of the USS or the number of bits of the DCI format 1-x of the USS to be the same by increasing or reducing the number of bits of the DCI format 0-1; step c: enabling the number of bits of the DCI format 1-1 of the USS and the number of bits of the DCI format 0-x of the USS or the number of bits of the DCI format 1-x of the USS to be the same by increasing or reducing the number of bits of the DCI format 1-1; step d: when a difference between the number of bits of the DCI format 0-1 of the USS and the number of bits of the DCI format 0-x of the USS or the number of bits of the DCI format 1-x of the USS is smaller or equal to a threshold value, enabling the number of bits of the DCI format 0-1 of the USS to be the same as the number of bits of the DCI format 0-x of the USS or the number of bits of the DCI format 1-x of the USS by increasing or reducing the number of bits of the DCI format 0-1 of the USS; and when a difference between the number of bits of the DCI format 0-1 of the USS and the number of bits of the DCI format 0-x of the USS or the number of bits of the DCI format 1-x of the USS is larger than the threshold value, stopping detecting the DCI format 0-1 of the USS by the UE; step e: when a difference between the number of bits of the DCI format 1-1 of the USS and the number of bits of the DCI format 0-x of the USS or the number of bits of the DCI format 1-x of the USS is smaller or equal to a threshold value, enabling the number of bits of the DCI format 1-1 of the USS to be the same as the number of bits of the DCI format 0-x of the USS or the number of bits of the DCI format 1-x of the USS by increasing or reducing the number of bits of the DCI format 1-1 of the USS; and when a difference between the number of bits of the DCI format 1-1 of the USS and the number of bits of the DCI format 0-x of the USS or the number of bits of the DCI format 1-x of the USS is larger than the threshold value, stopping detecting the DCI format 1-1 of the USS by the UE; and step f: enabling the number of bits of the DCI format 0-1 of the USS and the number of bits of the DCI format 1-1 of the USS to be the same by increasing or reducing the number of bits of the DCI format 0-1 of the USS or the number of bits of the DCI format 1-1 of the USS.

Alternatively, the reducing the number of the detected DCI formats with different numbers of bits includes: determining a priority of the DCI format; and reducing the number of bits of the DCI format according to the determined priority.

Alternatively, a number of bits of a DCI format having a low priority is changed prior to a number of bits of a DCI format having a high priority, and when a number of the detected DCI formats reaches a predetermined number after changing the number of bits of the DCI format, the changing the number of bits of the DCI format is stopped, and/or, the priority of the DCI format is determined according to service types of a PDSCH and a PUSCH scheduled by the DCI having the DCI format, and/or a priority of a DCI format of DCI that schedules the PDSCH or the PUSCH for URLLC data transmission is higher than a priority of a DCI format of DCI that schedules the PDSCH or the PUSCH for an eMBB data transmission.

Alternatively, the method further includes: reducing a number of blind detections (that is, a number of detections) corresponding to each DCI format, wherein the number of detections corresponding to the DCI format can be called the number of detections of the DCI format for short.

Alternatively, reducing the number of blind detections of the each DCI format includes: reducing the number of blind detections of the DCI format based on a priority, wherein the priority, based on which the number of blind detections of the DCI format is reduced, is determined based on service types of the PDSCH and/or the PUSCH; and/or, a number of blind detections of the DCI format having a low priority is reduced prior to a number of blind detections of the DCI format having a high priority, and when a blind detection complexity of the DCI reaches a predetermined degree after the number of blind detections of the DCI format is reduced, reducing the number of blind detections of the DCI format is stopped; and/or, a priority of a DCI format of a DCI that schedules the PUSCH or the PDSCH for an URLLC data transmission is higher than a priority of a DCI format of a DCI that schedules the PUSCH or the PDSCH for the eMBB data transmission.

Alternatively, the limiting the number of detections of the PDCCH and the number of detections of the non-overlapped CCE includes: when the UE configures a serving cell, or when the UE configures a CA or a DC, a maximum number of serving cells supported by a CA ability or a DC ability of the UE is a predetermined number, and when the predetermined number is larger than or equal to the number of the serving cells configured by the UE, determining a first correspondence between a sub-carrier spacing configuration of the PDCCH and a maximum number of detections of the PDCCH at each time slot in each serving cell configured by the UE and a second correspondence between the sub-carrier spacing configuration of the PDCCH and a maximum number of detections for the non-overlapped CCE at each time slot in each serving cell configured by the UE, and limiting the number of detections of the PDCCH and the number of detections of the non-overlapped CCE according to a result of the determining.

Alternatively, the limiting the number of detections of the PDCCH and the number of detections of the non-overlapped CCE further includes: when the UE configures the CA or the DC, the maximum number of the serving cells supported by the CA ability or the DC ability of the UE is a predetermined number, the predetermined number is smaller than or equal to a number $N_{cells}^{cap}$ of downlink serving cells indicated by the detection ability of the UE for detecting the PDCCH, and the UE configures $N_{cells}^{DL,\mu}$ downlink serving cells, according to the first correspondence, the second correspondence, the number $K_{cells}^{cap}$ of the downlink serving cells indicated by the detection ability, and the number $N_{cells}^{DL,\mu}$ of the downlink serving cells configured by the UE, determining a sum of the maximum numbers of detections for the PDCCHs with different sizes at each time slot in $N_{cells}^{DL,\mu}$ downlink serving cells by the UE, and a sum of the maximum numbers of detections for the non-overlapped CCEs at each time slot in $N_{cells}^{DL,\mu}$ downlink serving cells by the UE, and limiting the number of detections of the PDCCH and the number of detections of the non-overlapped CCE according to a result of the determining.

Alternatively, the limiting the number of detections of the PDCCH and the number of detections of the non-overlapped CCE further includes determining a third correspondence and a fourth correspondence according to the following steps, and limiting the number of detections of the PDCCH and the number of detections of the non-overlapped CCE according to the determined correspondences: when the UE configures a serving cell that supports URLLC service, determining the third correspondence between the maximum number of detections for the PDCCHs with different sizes at each time slot in the serving cell that supports the URLLC service and a sub-carrier spacing configuration of the PDCCH, and determining the fourth correspondence between the maximum number of detections for the non-overlapped CCE at each time slot in the serving cell that supports the URLLC service and the sub-carrier spacing configuration of the PDCCH.

Alternatively, the limiting the number of detections of the PDCCH and the number of detections of the non-overlapped CCE further includes: when at least one of the following conditions is satisfied, as for the serving cell that does not support the URLLC service, determining, according to the first correspondence and the second correspondence, a maximum number of detections of the PDCCHs with different sizes at each time slot in the serving cell that does not support the URLLC service and a maximum number of detections for the non-overlapped CCE at each time slot in the serving cell that does not support the URLLC service, and determining, according to the third correspondence and the fourth correspondence, a maximum number of detections of the PDCCHs with different sizes and a maximum number of detections for the non-overlapped CCE at each time slot in the serving cell that supports the URLLC service: Condition 1: the UE configures the CA or the DC, the UE supports the URLLC service, the CA ability or the DC ability of the UE at most supports a predetermined number of downlink serving cells, and the number of the serving cells that support the URLLC service configured by the UE is smaller than or equal to the predetermined number; Condition 2: the UE configures the CA or the DC, the UE supports the URLLC service, the CA ability or the DC ability of the UE at most supports a predetermined number of downlink serving cells, the number of the serving cells that support the URLLC service configured by the UE is smaller than a number s1, and the number s1 is smaller than or equal to the predetermined number; Condition 3: the UE configures the CA or the DC, the UE supports the URLLC service, the CA ability or the DC ability of the UE at most supports a predetermined number of downlink serving cells, the number of the serving cells that support the URLLC service configured by the UE is smaller than a number s1, the number of the serving cells that do not support the URLLC service configured by the UE is smaller than or equal to a number s2, the number s1 is smaller than or equal to the predetermined number, and the number s2 is smaller than or equal to the predetermined number; Condition 4: the UE configures the CA or the DC, the UE supports the URLLC service, the CA ability or the DC ability of the UE at most supports a predetermined number of downlink serving cells, the number of the serving cells that support the URLLC service configured by the UE is h1, the number of the serving cells that do not support the URLLC service configured by the UE is h2, and h1×(1+alpha)+h2 or h1×alpha_1+h2 is smaller than or equal to the predetermined number, wherein alpha and alpha_1 are predetermined factors, respectively.

Alternatively, in the case where the UE configures the CA or the DC, the UE supports the URLLC service, the number of the downlink serving cells that are supported by the CA ability or the DC ability of the UE is more than a predetermined number, a PDCCH detection ability of the UE includes $N_{cells}^{cap}$ downlink serving cells, $N_{cells}^{cap}$ is larger than or equal to the predetermined number, and the UE configures $N_{cells}^{DL,\mu}$ downlink serving cells, the limiting the number of detections of the PDCCH and the number of detections of the non-overlapped CCE further includes determining the maximum number of detections through at least one of the following manners, and limiting a corresponding number of detections according to a result of the determining: Manner 1: according to the first correspondence and the second correspondence, determining the maximum number of detections for the PDCCHs with different sizes at each time slot in each downlink serving cell, and the maximum number of detections for the non-overlapped CCE at each time slot in each downlink serving cell; Manner 2: according to the third correspondence and the fourth correspondence, determining the maximum number of detections for the PDCCHs with different sizes at each time slot in each downlink serving cell, and the maximum number of detections for the non-overlapped CCE at each time slot in each downlink serving cell; Manner 3: according to the first correspondence and the second correspondence, determining the maximum number of detections of the PDCCHs with different sizes at each time slot in each downlink serving cell that supports the URLLC service and the maximum number of detections for the non-overlapped CCE at each time slot in each downlink serving cell that supports the URLLC service, and according to the third correspondence and the fourth correspondence, determining the maximum number of detections of the PDCCHs with different sizes at each time slot in each downlink serving cell that does not support the URLLC service and the maximum number of detections for the non-overlapped CCE at each time slot in each downlink serving cell that does not support the URLLC service; Manner 4: according to the first correspondence and the third correspondence, determining the maximum number of detections of the PDCCHs with different sizes at each time slot in each downlink serving cell that does not introduce the URLLC service and each downlink serving cell that introduces the URLLC service, and according to the second correspondence and the fourth correspondence, determining the maximum number of detections for the non-overlapped CCE at each time slot in each downlink serving cell that does not introduce the URLLC service and each downlink serving cell that introduces the URLLC service; Manner 5: allocating, in a precedent sequence, a part of the PDCCH detection ability of the UE to the downlink serving cell that supports the URLLC service, based on a predetermined weight factor α, the part corresponding to the number of the downlink serving cells that support the URLLC service, the number being weighted through the weight factor α1, and allocating an ability other than the part of the PDCCH detection ability of the UE to a rest downlink serving cell; and Manner 6: allocating, in a precedent sequence, a part of the PDCCH detection ability of the UE to the downlink serving cell that supports the URLLC service, based on the predetermined weight factor α1, the part corresponding to the number of the downlink serving cells that support the URLLC service, the number being weighted through the weight factor α1, and allocating an ability other than the part of the PDCCH detection ability of the UE to each downlink serving cell averagely.

According to another exemplary embodiment of the present disclosure, there is provided an apparatus of receiving downlink control information (DCI), which includes: a detection time determining unit, which determines detections corresponding to a DCI detection ability of a UE and a number of detections corresponding to a DCI format; a detection time adjusting unit, which reduces the number of detections corresponding to the DCI format, wherein the reduced number of detections corresponding to the DCI format is smaller than or equal to the number of detections corresponding to the DCI detection ability; and a DCI receiving unit which receives the DCI according to the reduced number of detections corresponding to the DCI format.

Alternatively, the detection time adjusting unit includes: a bit number changing unit which reduces a number of the detected DCI formats with different numbers of bits by changing a number of bits of at least one DCI format, to remove the number of detections corresponding to the DCI format removed by changing the number of bits, and/or, a detection time limiting unit which limits a number of detections of a PDCCH and a number of detections of a non-overlapped CCE.

Alternatively, as for a serving cell that introduces an URLLC service transmission, the bit number changing unit reduces the number of the detected DCI formats with different numbers of bits through at least one operation of: enabling a number of bits of a DCI format 0-0 of a CSS and a number of bits of a DCI format 1-0 of the CSS to be the same by increasing or reducing the number of bits of the DCI format; enabling a number of bits of a DCI format 0-0 of a USS and a number of bits of a DCI format 1-0 of the CSS to be the same by increasing or reducing the number of bits of the DCI format; when a number of bits of a DCI format 0-1 of the USS is the same as the number of bits of the DCI format 0-0 of the USS or a number of bits of a DCI format 1-0 of the USS, increasing the number of bits of the DCI format 0-1 of the USS by 1 bit, to enable the number of bits of the DCI format 0-1 of the USS to be different from the number of bits of the DCI format 0-0 of the USS or the number of bits of the DCI format 1-0 of the USS; when a number of bits of a DCI format 1-1 of the USS is the same as the number of bits of the DCI format 0-0 of the USS or the number of bits of the DCI format 1-0 of the USS, increasing the number of bits of the DCI format 1-1 of the USS by 1 bit, to enable the number of bits of the DCI format 1-1 of the USS to be different from the number of bits of the DCI format 0-0 of the USS or the number of bits of the DCI format 1-0 of the USS, wherein when the number of the DCI formats with different number of bits detected in each serving cell by the UE is enabled, through the above operation, to be smaller than or equal to M, and a number of the DCI formats with different number of bits scrambled with the C-RNTI detected in the each serving cell by the UE is enabled, through the at least one step, to be smaller than or equal to N, then the reducing the number of the detected DCI formats with different number of bits is completed, and wherein N≥4, and M≥3.

Alternatively, as for the serving cell that introduces the URLLC service transmission, when the bit number changing unit, through the at least one operation, does not enable the number of the DCI formats with different number of bits detected in each serving cell by the UE to be smaller than or equal to M and the number of the DCI formats with different number of bits scrambled with the C-RNTI detected in the each serving cell by the UE to be smaller than or equal to N, the following steps are performed in an order of step b, step c, step d, step e, step f and step a, until the number of the DCI formats with different number of bits detected in the each serving cell by the UE is smaller than or equal to M and the number of the DCI formats with different number of bits scrambled with the C-RNTI detected in the each serving cell by the UE is smaller than or equal to N, and wherein N≥4, and M≥3: step a: enabling a number of bits of a DCI format 0-x of the USS and a number of bits of a DCI format 1-x of the USS to be the same by increasing or reducing the number of bits of the DCI format 0-x or the number of bits of the DCI format 1-x; step b: enabling the number of bits of the DCI format 0-1 of the USS and the number of bits of the DCI format 0-x of the USS or the number of bits of the DCI format 1-x of the USS to be the same by increasing or reducing the number of bits of the DCI format 0-1; step c: enabling the number of bits of the DCI format 1-1 of the USS and the number of bits of the DCI format 0-x of the USS or the number of bits of the DCI format 1-x of the USS to be the same by increasing or reducing the number of bits of the DCI format 1-1; step d: when a difference between the number of bits of the DCI format 0-1 of the USS and the number of bits of the DCI format 0-x of the USS or the number of bits of the DCI format 1-x of the USS is smaller or equal to a threshold value, enabling the number of bits of the DCI format 0-1 of the USS to be the same as the number of bits of the DCI format 0-x of the USS or the number of bits of the DCI format 1-x of the USS by increasing or reducing the number of bits of the DCI format 0-1 of the USS; and when a difference between the number of bits of the DCI format 0-1 of the USS and the number of bits of the DCI format 0-x of the USS or the number of bits of the DCI format 1-x of the USS is larger than the threshold value, stopping detecting the DCI format 0-1 of the USS by the UE; step e: when a difference between the number of bits of the DCI format 1-1 of the USS and the number of bits of the DCI format 0-x of the USS or the number of bits of the DCI format 1-x of the USS is smaller or equal to a threshold value, enabling the number of bits of the DCI format 1-1 of the USS to be the same as the number of bits of the DCI format 0-x of the USS or the number of bits of the DCI format 1-x of the USS by increasing or reducing the number of bits of the DCI format 1-1 of the USS; and when a difference between the number of bits of the DCI format 1-1 of the USS and the number of bits of the DCI format 0-x of the USS or the number of bits of the DCI format 1-x of the USS is larger than the threshold value, stopping detecting the DCI format 1-1 of the USS by the UE; and step f: enabling the number of bits of the DCI format 0-1 of the USS and the number of bits of the DCI format 1-1 of the USS to be the same by increasing or reducing the number of bits of the DCI format 0-1 or the number of bits of the DCI format 1-1 of the USS.

Alternatively, the bit number changing unit can determine the priority of the DCI format, and reduce the number of bits of the DCI format according to the determined priority.

Alternatively, a number of bits of a DCI format having a low priority is changed prior to a number of bits of a DCI format having a high priority, and when a number of the detected DCI formats reaches a predetermined number after changing the number of bits of the DCI format, changing the number of bits of the DCI format is stopped, and/or, the priority of the DCI format is determined according to service types of a PDSCH and a PUSCH scheduled by the DCI having the DCI format, and/or a priority of a DCI format of a DCI that schedules the PDSCH or the PUSCH for URLLC data transmission is higher than a priority of a DCI format of a DCI that schedules the PDSCH or the PUSCH for an eMBB data transmission.

Alternatively, the apparatus further includes: a blind detection time adjusting unit (or called a detection time adjusting unit) which reduces the number of blind detections of each DCI format.

Alternatively, the blind detection time adjusting unit is configured to: reduce the number of blind detections of the DCI based on a priority, wherein the priority, based on which the number of blind detections of the DCI format is reduced, is determined based on service types of the PDSCH and/or the PUSCH; and/or, a number of detections of the DCI format having a low priority is reduced prior to a number of blind detections of the DCI format having a high priority, and when a detection complexity of the DCI reaches a predetermined degree after the number of blind detections of the DCI format is reduced, reducing the number of blind detections of the DCI format is stopped; and/or, a priority of a DCI format of a DCI that schedules the PUSCH or the PDSCH for an URLLC data transmission is higher than a priority of a DCI format of a DCI that schedules the PUSCH or the PDSCH for the eMBB data transmission.

Alternatively, the detection time limiting unit is configured to: when the UE configures a serving cell, or when the UE configures a CA or a DC, a maximum number of the serving cells supported by a CA ability or a DC ability of the UE is a predetermined number, and the predetermined number is larger than or equal to the number of the serving cells configured by the UE, determine a first correspondence between a sub-carrier spacing configuration of the PDCCH and a maximum number of detections of the PDCCH at each time slot in each serving cell configured by the UE, and a second correspondence between the sub-carrier spacing configuration of the PDCCH and a maximum number of detections for the non-overlapped CCE at each time slot in each serving cell configured by the UE, and limit the number of detections of the PDCCH and the number of detections of the non-overlapped CCE according to the determined result.

Alternatively, the detection time limiting unit is configured to: when the UE configures the CA or the DC, the maximum number of the serving cells supported by the CA ability or the DC ability of the UE is a predetermined number, the predetermined number is smaller than or equal to a number $N_{cells}^{cap}$ of downlink serving cells indicated by the detection ability of the UE for detecting the PDCCH, and the UE configures $N_{cells}^{DL,\mu}$ downlink serving cells, according to the first correspondence, the second correspondence, the number $N_{cells}^{cap}$ of the downlink serving cells indicated by the detection ability, and the number $N_{cells}^{DL,\mu}$ of the downlink serving cells configured by the UE, determine a sum of the maximum numbers of detections for the PDCCHs with different sizes at each time slot in $N_{cells}^{DL,\mu}$ downlink serving cells by the UE, and a sum of the maximum numbers of detections for the non-overlapped CCEs at each time slot in $N_{cells}^{DL,\mu}$ downlink serving cells by the UE, and limit the number of detections of the PDCCH and the number of detections of the non-overlapped CCE according to a result of the determination.

Alternatively, the detection time limiting unit is configured to: determine a third correspondence and a fourth correspondence according to the following operation, and limit the number of detections of the PDCCH and the number of detections of the non-overlapped CCE according to the determined correspondences: when the UE configures a serving cell that supports a URLLC service, determining the third correspondence between the maximum number of detections for the PDCCHs with different sizes at each time slot in the serving cell that supports the URLLC service and a sub-carrier spacing configuration of the PDCCH, and determining the fourth correspondence between the maximum number of detections for the non-overlapped CCE at each time slot in the serving cell that supports the URLLC service and the sub-carrier spacing configuration of the PDCCH.

Alternatively, the detection time limiting unit is configured to: when at least one of the following conditions is satisfied, as for the serving cell that does not support the URLLC service, determine, according to the first correspondence and the second correspondence, a maximum number of detections of the PDCCHs with different sizes and a maximum number of detections for the non-overlapped CCE at each time slot in the serving cell that does not support the URLLC service, and determine, according to the third correspondence and the fourth correspondence, a maximum number of detections of the PDCCHs with different sizes and a maximum number of detections for the non-overlapped CCE at each time slot in the serving cell that supports the URLLC service: Condition 1: the UE configures the CA or the DC, the UE supports the URLLC service, the CA ability or the DC ability of the UE at most supports a predetermined number of downlink serving cells, and the number of the serving cells that support the URLLC service configured by the UE is smaller than or equal to the predetermined number; Condition 2: the UE configures the CA or the DC, the UE supports the URLLC service, the CA ability or the DC ability of the UE at most supports a predetermined number of downlink serving cells, the number of the serving cells that support the URLLC service configured by the UE is smaller than a number s1, and the number s1 is smaller than or equal to the predetermined number; Condition 3: the UE configures the CA or the DC, the UE supports the URLLC service, the CA ability or the DC ability of the UE at most supports a predetermined number of downlink serving cells, the number of the serving cells that support the URLLC service configured by the UE is smaller than a number s1, the number of the serving cells that do not support the URLLC service configured by the UE is smaller than or equal to a number s2, the number s1 is smaller than or equal to the predetermined number, and the number s2 is smaller than or equal to the predetermined number; and Condition 4: the UE configures the CA or the DC, the UE supports the URLLC service, the CA ability or the DC ability of the UE at most supports a predetermined number of downlink serving cells, the number of the serving cells that support the URLLC service configured by the UE is h1, the number of the serving cells that do not support the URLLC service configured by the UE is h2, and h1×(1+alpha)+h2 or h1×alpha_1+h2 is smaller than or equal to the predetermined number, wherein alpha and alpha_1 are predetermined factors, respectively.

Alternatively, in the case where the UE configures the CA or the DC, the UE supports the URLLC service, the number of the downlink serving cells that are supported by the CA ability or the DC ability of the UE is more than a predetermined number, a PDCCH detection ability of the UE includes $N_{cells}^{cap}$ downlink serving cells, $N_{cells}^{cap}$ is larger than or equal to the predetermined number, and the UE configures $N_{cells}^{DL,\mu}$ downlink serving cells, the detection time limiting unit is configured to: determine a maximum number of detections through at least one of the following manners, and limit a corresponding number of detections according to a result of the determination: Manner 1: according to the first correspondence and the second correspondence, determining the maximum number of detections for the PDCCHs with different sizes at each time slot in each downlink serving cell, and the maximum number of detections for the non-overlapped CCE at each time slot in each downlink serving cell; Manner 2: according to the third correspondence and the fourth correspondence, determining the maximum number of detections for the PDCCHs with different sizes at each time slot in each downlink serving cell, and the maximum number of detections for the non-overlapped CCE at each time slot in each downlink serving cell; Manner 3: according to the first correspondence and the second correspondence, determining the maximum number of detections of the PDCCHs with different sizes at each time slot in each downlink serving cell that supports the URLLC service and the maximum number of detections for the non-overlapped CCE at each time slot in each downlink serving cell that supports the URLLC service, and according to the third correspondence and the fourth correspondence, determining the maximum number of detections of the PDCCHs with different sizes at each time slot in each downlink serving cell that does not support the URLLC service and the maximum number of detections for the non-overlapped CCE at each time slot in each downlink serving cell that does not support the URLLC service; Manner 4: according to the first correspondence and the third correspondence, determining the maximum number of detections of the PDCCHs with different sizes at each time slot in each downlink serving cell that does not introduce the URLLC service and each downlink serving cell that introduces the URLLC service, and according to the second correspondence and the fourth correspondence, determining the maximum number of detections for the non-overlapped CCE at each time slot in each downlink serving cell that does not introduce the URLLC service and each downlink serving cell that introduces the URLLC service; Manner 5: allocating, in a precedent sequence, a part of the PDCCH detection ability of the UE to the downlink serving cell that supports the URLLC service, based on a predetermined weight factor α, the part corresponding to the number of the downlink serving cells that support the URLLC service, the number being weighted through the weight factor α, and allocating an ability other than the part of the PDCCH detection ability of the UE to a rest downlink serving cell; and Manner 6: allocating, in a precedent sequence, a part of the PDCCH detection ability of the UE to the downlink serving cell that supports the URLLC service, based on the predetermined weight factor α1, the part corresponding to the number of the downlink serving cells that support the URLLC service, the number being weighted through the weight factor α1, and allocating an ability other than the part of the PDCCH detection ability of the UE to each downlink serving cell averagely.

According to another exemplary embodiment of the present disclosure, there is provided a system including at least one computing device and at least one storage device storing an instruction, wherein when the instruction is operated by the at least one computing device, the at least one computing device is enabled to perform the above described method.

According to another exemplary embodiment of the present disclosure, there is provided a computer readable storage medium for storing instructions, wherein when the instructions are operated by at least one computing device, the at least one computing device is enabled to perform the above described method.

Based on the method and apparatus of the present disclosure, the UE can reduce the DCI the number of detections corresponding to the DCI format, and receive the DCI according to the reduced number of detections corresponding to the DCI format. More particularly, the UE can reduce a number of the detected DCI formats by changing a number of bits of at least one DCI format, to remove the number of detections corresponding to the DCI format removed by changing the number of bits, and/or can limit the number of detections of the PDCCH and the number of detections of the non-overlapped CCE. Since the number of detections is reduced, the complexity of the procedure of receiving the DCI (that is, the procedure of detecting the DCI) can be reduced, and in the case where the URLLC data transmission is not affected, the effect on the Enhanced Mobile Broadband (eMBB) data transmission can be reduced.

BRIEF DESCRIPTION OF THE DRAWINGS

The above and other purposes and characteristics of the exemplary embodiments of the present disclosure will become clearer through the following descriptions conducted in conjunction with drawings which exemplarily illustrate the embodiments, wherein:

FIG. 1 illustrates a wireless communication system according to various embodiments of the present disclosure;

FIG. 2 illustrates the BS in the wireless communication system according to various embodiments of the present disclosure;

FIG. 3 illustrates the terminal in the wireless communication system according to various embodiments of the present disclosure;

FIG. 4 illustrates the communication interface in the wireless communication system according to various embodiments of the present disclosure;

FIG. 5 illustrates a flow chart of a method of receiving DCI according to an exemplary embodiment of the present disclosure; and FIG. 6 illustrates a block diagram of an apparatus of receiving DCI according to an exemplary embodiment of the present disclosure.

DETAILED DESCRIPTION

Now embodiments of the present disclosure will be referred to in details, and examples of the embodiments are shown in the drawings, wherein the like reference number always indicates the like component. The embodiments will be explained by referring to the drawings, to explain the present disclosure.

Hereinafter, in various embodiments of the present disclosure, hardware approaches will be described as an example. However, various embodiments of the present disclosure include a technology that uses both hardware and software and thus, the various embodiments of the present disclosure may not exclude the perspective of software.

Hereinafter, the present disclosure describes technology for data transmission in a wireless communication system.

The terms referring to an addition request message, the terms referring to a signal, the terms referring to a channel, the terms referring to control information, the terms referring to a network entity, and the terms referring to elements of a device used in the following description are used only for convenience of the description. Accordingly, the present disclosure is not limited to the following terms, and other terms having the same technical meaning may be used.

Further, although the present disclosure describes various embodiments based on the terms used in some communication standards (for example, 3rd Generation Partnership Project (3GPP)), they are only examples for the description. Various embodiments of the present disclosure may be easily modified and applied to other communication systems.

FIG. 1 illustrates a wireless communication system according to various embodiments of the present disclosure. In FIG. 1, a base station (BS) 110, a terminal 120, and a terminal 130 are illustrated as the part of nodes using a wireless channel in a wireless communication system. FIG. 1 illustrates only one BS, but another BS, which is the same as or similar to the BS 110, may be further included.

The BS 110 is network infrastructure that provides wireless access to the terminals 120 and 130. The BS 110 has coverage defined as a predetermined geographical region based on the distance at which a signal can be transmitted. The BS 110 may be referred to as "access point (AP)," "eNodeB (eNB)," "5th generation (5G) node," "wireless point," "transmission/reception Point (TRP)" as well as "base station."

Each of the terminals 120 and 130 is a device used by a user, and performs communication with the BS 110 through a wireless channel. Depending on the case, at least one of the terminals 120 and 130 may operate without user involvement. That is, at least one of the terminals 120 and 130 is a device that performs machine-type communication (MTC) and may not be carried by the user. Each of the terminals 120 and 130 may be referred to as "user equipment (UE)," "mobile station," "subscriber station," "remote terminal," "wireless terminal," or "user device" as well as "terminal."

The BS 110, the terminal 120, and the terminal 130 may transmit and receive wireless signals in millimeter wave (mmWave) bands (for example, 28 GHz, 30 GHz, 38 GHz, and 60 GHz). At this time, in order to improve a channel gain, the BS 110, the terminal 120, and the terminal 130 may perform beamforming. The beamforming may include transmission beamforming and reception beamforming. That is, the BS 110, the terminal 120, and the terminal 130 may assign directivity to a transmission signal and a reception signal. To this end, the BS 110 and the terminals 120 and 130 may select serving beams 112, 113, 121, and 131 through a beam search procedure or a beam management procedure. After that, communications may be performed using resources having a quasi co-located relationship with resources carrying the serving beams 112, 113, 121, and 131.

A first antenna port and a second antenna ports are considered to be quasi co-located if the large-scale properties of the channel over which a symbol on the first antenna port is conveyed can be inferred from the channel over which a symbol on the second antenna port is conveyed. The large-scale properties may include one or more of delay spread, doppler spread, doppler shift, average gain, average delay, and spatial Rx parameters.

FIG. 2 illustrates the BS in the wireless communication system according to various embodiments of the present disclosure. A structure exemplified at FIG. 2 may be understood as a structure of the BS 110. The term "-module", "-unit" or "-er" used hereinafter may refer to the unit for processing at least one function or operation and may be implemented in hardware, software, or a combination of hardware and software.

Referring to FIG. 2, the BS may include a wireless communication interface 210, a backhaul communication interface 220, a storage unit 230, and a controller 240.

The wireless communication interface 210 performs functions for transmitting and receiving signals through a wireless channel. For example, the wireless communication interface 210 may perform a function of conversion between a baseband signal and bitstreams according to a physical layer standard of the system. For example, in data transmission, the wireless communication interface 210 generates complex symbols by encoding and modulating transmission bitstreams. Further, in data reception, the wireless communication interface 210 reconstructs reception bitstreams by demodulating and decoding the baseband signal.

In addition, the wireless communication interface 210 up-converts the baseband signal into an Radio Frequency (RF) band signal, transmits the converted signal through an antenna, and then down-converts the RF band signal received through the antenna into the baseband signal. To this end, the wireless communication interface 210 may include a transmission filter, a reception filter, an amplifier, a mixer, an oscillator, a digital-to-analog convertor (DAC), an analog-to-digital convertor (ADC), and the like. Further, the wireless communication interface 210 may include a plurality of transmission/reception paths. In addition, the wireless communication interface 210 may include at least one antenna array consisting of a plurality of antenna elements.

On the hardware side, the wireless communication interface 210 may include a digital unit and an analog unit, and the analog unit may include a plurality of sub-units according to operation power, operation frequency, and the like. The digital unit may be implemented as at least one processor (e.g., a digital signal processor (DSP)).

The wireless communication interface 210 transmits and receives the signal as described above. Accordingly, the wireless communication interface 210 may be referred to as a "transmitter" a "receiver," or a "transceiver." Further, in the following description, transmission and reception performed through the wireless channel may be used to have a meaning including the processing performed by the wireless communication interface 210 as described above.

The backhaul communication interface 220 provides an interface for performing communication with other nodes within the network. That is, the backhaul communication interface 220 converts bitstreams transmitted to another node, for example, another access node, another BS, a higher node, or a core network, from the BS into a physical signal and converts the physical signal received from the other node into the bitstreams.

The storage unit 230 stores a basic program, an application, and data such as setting information for the operation of the BS 110. The storage unit 230 may include a volatile memory, a non-volatile memory, or a combination of volatile memory and non-volatile memory. Further, the storage unit 230 provides stored data in response to a request from the controller 240.

The controller 240 controls the general operation of the BS. For example, the controller 240 transmits and receives a signal through the wireless communication interface 210 or the backhaul communication interface 220. Further, the controller 240 records data in the storage unit 230 and reads the recorded data. The controller 240 may performs functions of a protocol stack that is required from a communication standard. According to another implementation, the protocol stack may be included in the wireless communication interface 210. To this end, the controller 240 may include at least one processor.

According to exemplary embodiments of the present disclosure, the controller 240 may transmit, to a secondary base station, an addition request message, wherein the addition request message carries information of a secondary cell group (SCG) split bearer; and receive, from the secondary base station, a response message of the addition request message. For example, the controller 240 may control the base station to perform operations according to the exemplary embodiments of the present disclosure.

FIG. 3 illustrates the terminal in the wireless communication system according to various embodiments of the present disclosure. A structure exemplified at FIG. 3 may be understood as a structure of the terminal 120 or the terminal 130. The term "-module", "-unit" or "-er" used hereinafter may refer to the unit for processing at least one function or operation, and may be implemented in hardware, software, or a combination of hardware and software.

Referring to FIG. 3, the terminal 120 includes a communication interface 310, a storage unit 320, and a controller 330.

The communication interface 310 performs functions for transmitting/receiving a signal through a wireless channel. For example, the communication interface 310 performs a function of conversion between a baseband signal and bitstreams according to the physical layer standard of the system. For example, in data transmission, the communication interface 310 generates complex symbols by encoding and modulating transmission bitstreams. Also, in data reception, the communication interface 310 reconstructs reception bitstreams by demodulating and decoding the baseband signal. In addition, the communication interface 310 up-converts the baseband signal into an RF band signal, transmits the converted signal through an antenna, and then down-converts the RF band signal received through the antenna into the baseband signal. For example, the communication interface 310 may include a transmission filter, a reception filter, an amplifier, a mixer, an oscillator, a DAC, and an ADC.

Further, the communication interface 310 may include a plurality of transmission/reception paths. In addition, the communication interface 310 may include at least one antenna array consisting of a plurality of antenna elements. In the hardware side, the wireless communication interface 210 may include a digital circuit and an analog circuit (for example, a radio frequency integrated circuit (RFIC)). The digital circuit and the analog circuit may be implemented as one package. The digital circuit may be implemented as at least one processor (e.g., a DSP). The communication interface 310 may include a plurality of RF chains. The communication interface 310 may perform beamforming.

The communication interface 310 transmits and receives the signal as described above. Accordingly, the communication interface 310 may be referred to as a "transmitter," a "receiver," or a "transceiver." Further, in the following description, transmission and reception performed through the wireless channel is used to have a meaning including the processing performed by the communication interface 310 as described above.

The storage unit 320 stores a basic program, an application, and data such as setting information for the operation of the terminal 120. The storage unit 320 may include a volatile memory, a non-volatile memory, or a combination of volatile memory and non-volatile memory. Further, the storage unit 320 provides stored data in response to a request from the controller 330.

The controller 330 controls the general operation of the terminal 120. For example, the controller 330 transmits and receives a signal through the communication interface 310. Further, the controller 330 records data in the storage unit 320 and reads the recorded data. The controller 330 may performs functions of a protocol stack that is required from a communication standard. According to another implementation, the protocol stack may be included in the communication interface 310. To this end, the controller 330 may include at least one processor or microprocessor, or may play the part of the processor. Further, the part of the communication interface 310 or the controller 330 may be referred to as a communication processor (CP).

According to exemplary embodiments of the present disclosure, the controller 330 may control the terminal to perform operations according to the exemplary embodiments of the present disclosure.

FIG. 4 illustrates the communication interface in the wireless communication system according to various embodiments of the present disclosure. FIG. 4 shows an example for the detailed configuration of the communication interface 210 of FIG. 2 or the communication interface 310 of FIG. 3. More specifically, FIG. 4 shows elements for performing beamforming as part of the communication interface 210 of FIG. 2 or the communication interface 310 of FIG. 3.

Referring to FIG. 4, the communication interface 210 or 310 includes an encoding and circuitry 402, a digital circuitry 404, a plurality of transmission paths 406-1 to 406-N, and an analog circuitry 408.

The encoding and circuitry 402 performs channel encoding. For the channel encoding, at least one of a low-density parity check (LDPC) code, a convolution code, and a polar code may be used. The encoding and circuitry 402 generates modulation symbols by performing constellation mapping.

The digital circuitry 404 performs beamforming for a digital signal (for example, modulation symbols). To this end, the digital circuitry 404 multiples the modulation symbols by beamforming weighted values. The beamforming weighted values may be used for changing the size and phrase of the signal, and may be referred to as a "precoding matrix" or a "precoder." The digital circuitry 404 outputs the digitally beamformed modulation symbols to the plurality of transmission paths 406-1 to 406-N. At this time, according to a multiple input multiple output (MIMO) transmission scheme, the modulation symbols may be multiplexed, or the same modulation symbols may be provided to the plurality of transmission paths 406-1 to 406-N.

The plurality of transmission paths 406-1 to 406-N convert the digitally beamformed digital signals into analog signals. To this end, each of the plurality of transmission paths 406-1 to 406-N may include an inverse fast Fourier transform (IFFT) calculation unit, a cyclic prefix (CP) insertion unit, a DAC, and an up-conversion unit. The CP insertion unit is for an orthogonal frequency division multiplexing (OFDM) scheme, and may be omitted when another physical layer scheme (for example, a filter bank multi-carrier: FBMC) is applied. That is, the plurality of transmission paths 406-1 to 406-N provide independent signal processing processes for a plurality of streams generated through the digital beamforming. However, depending on the implementation, some of the elements of the plurality of transmission paths 406-1 to 406-N may be used in common.

The analog circuitry 408 performs beamforming for analog signals. To this end, the digital circuitry 404 multiples the analog signals by beamforming weighted values. The beamformed weighted values are used for changing the size and phrase of the signal. More specifically, according to a connection structure between the plurality of transmission paths 406-1 to 406-N and antennas, the analog circuitry 408 may be configured in various ways. For example, each of the plurality of transmission paths 406-1 to 406-N may be connected to one antenna array. In another example, the plurality of transmission paths 406-1 to 406-N may be connected to one antenna array. In still another example, the plurality of transmission paths 406-1 to 406-N may be adaptively connected to one antenna array, or may be connected to two or more antenna arrays.

Methods according to embodiments stated in claims and/or specifications of the present disclosure may be implemented in hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the present disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of the may form a memory in which the program is stored. Further, a plurality of such memories may be included in the electronic device.

In addition, the programs may be stored in an attachable storage device which is accessible through communication networks such as the Internet, Intranet, local area network (LAN), wide area network (WAN), and storage area network (SAN), or a combination thereof. Such a storage device may access the electronic device via an external port. Further, a separate storage device on the communication network may access a portable electronic device.

In the above-described detailed embodiments of the present disclosure, a component included in the present disclosure is expressed in the singular or the plural according to a presented detailed embodiment. However, the singular form or plural form is selected for convenience of description suitable for the presented situation, and various embodiments of the present disclosure are not limited to a single element or multiple elements thereof. Further, either multiple elements expressed in the description may be configured into a single element or a single element in the description may be configured into multiple elements.

While the present disclosure has been shown and described with reference to certain embodiments thereof, it will be understood by those skilled in the art that various changes in form and details may be made therein without departing from the scope of the present disclosure. Therefore, the scope of the present disclosure should not be defined as being limited to the embodiments, but should be defined by the appended claims and equivalents thereof.

Although the present disclosure has been described with an exemplary embodiment, various changes and modifications may be suggested to one skilled in the art. It is intended that the present disclosure encompass such changes and modifications as fall within the scope of the appended claims.

In the present disclosure, the term 'size' may be used in the same sense as or the same as the number of bits. For example, DCI size refers to the number of information bits in DCI. Determining the size may be performed by a base station that allocates resources. In addition, determining the size may also be performed by the terminal to receive the DCI (or monitor PDCCH). Adjusting the size or aligning (alignment) may also be performed for transmission of control information of the base station or may be performed for receiving control of the terminal. Also, in the present disclosure, the term 'component carrier (CC)' may be used to refer to a cell (or serving cell).

The UE can transmit or receive uplink data or downlink data with different priorities simultaneously in the same serving cell, or the UE transmits or receives the uplink data or the downlink data with different priorities simultaneously in different serving cells, for example, transmitting or receiving eMBB data and URLLC data simultaneously, wherein a reliability of the URLLC data transmission is higher than a reliability of the eMBB data transmission. The PDSCH (or PUSCH) for transmitting different types of data can be distinguished through the DCI formats with different numbers of bits, or distinguished through Cyclic Redundancy Check (CRC) scrambled by different Radio Network Temporary Indicators (RNTIs) (for example, Cell-RNTIs (C-RNTIs)).

In the present disclosure, considering that the DCI formats with different numbers of bits can be used to distinguish the PDSCH (or PUSCH), and an addition of the number of the DCI formats with different numbers of bits may increase the number of detections corresponding a newly added DCI format, thereby increasing the complexity of the procedure of receiving (can also be considered as monitoring) the DCI by the UE. Thus, the complexity can be reduced by reducing the number of the DCI formats with different numbers of bits that have been detected (or are to be detected). Particularly, numbers of bits of two DCI formats with different numbers of bits can be enabled to be the same by increasing or reducing the number of bits of the DCI format, so as to reduce the number of the DCI formats with different numbers of bits, for example, a number of bits used for scheduling the DCI format 0-0 of the PUSCH is enabled to the same as a number of bits used for scheduling the DCI format 1-0 of the PDSCH by increasing or reducing the number of bits of the DCI format.

In addition, the detection on the DCI in the PDCCH may include: performing exploratory demodulating and decoding on the CSS and USS for transmitting the PDCCH, and performing checking through the CRC scrambled by adopting the RNTI, to find the DCI in the PDCCH scheduled by a base station. Since the procedure of detecting the DCI relates to the detection of PDCCH and the detection of a Control Channel Element (CCE), the complexity of the procedure of receiving the DCI can be reduced by reducing the number of detections of PDCCH and the number of detections of CCE.

On this basis, the present disclosure provides a method of receiving DCI, as shown in FIG. 5, the method may include step 510 to step 530.

At step 510, a UE determines a number of detections corresponding to a DCI detection ability of the UE and a number of detections corresponding to a DCI format; at step 520, the UE reduces the number of detections corresponding to the DCI format, wherein the reduced number of detections corresponding to the DCI format is smaller than or equal to the number of detections corresponding to the DCI detection ability; and at step 530, the UE receives the DCI according to the reduced number of detections corresponding to the DCI format.

As an example, a number of detections corresponding to a DCI detection ability of the UE and/or a number of detections corresponding to a DCI format can be determined through a protocol, and can also be determined through configuration of a base station. The number of detections corresponding to the DCI format can be reduced through step 520, so that the complexity of receiving the DCI can be reduced.

As an example, step 520 can include: reducing a number of the detected DCI formats with different numbers of bits by changing a number of bits of at least one DCI format, to remove the number of detections corresponding to the DCI format removed by changing the number of bits from the total number of times that needs to be detected. Here, the number of bits of the DCI format indicates the number of bits required by the DCI having the DCI format, or the number of bits configured to the DCI. After performing step 510, the DCI can be detected according to a common DCI detection method or step 520. In the step of limiting the number of detections, the number of detections of the PDCCH and the number of detections of the non-overlapped CCE can be reduced. Before the step of limiting the number of detections, the number of the DCI formats with different numbers of bits (namely the number of bits corresponding to the DCI formats) can be determined according to a common method, or the number of the DCI formats with different numbers of bits is determined according to the step of reducing the detected number of the DCI formats with different numbers of bits.

As an example, the reducing the number of the detected DCI formats with different numbers of bits may include: determining a priority of the DCI format; and reducing the number of bits of the DCI format according to the determined priority.

As an example, a number of bits of a DCI format having a low priority is changed prior to a number of bits of a DCI format having a high priority, and when changing a certain number (one or more) of the number of bits of the DCI format and enabling the detected DCI formats with different numbers of bits to reach a predetermined number, changing the number of bits of the DCI format is stopped.

As an example, the priority of the DCI format is determined according to service types of the PDSCH and the PUSCH scheduled by the DCI having the DCI format (for example, types of transmitted data).

As an example, a priority of a DCI format of a DCI in the PDCCH that schedules URLLC data transmission is higher than a priority of a DCI format of a DCI in the PDCCH that schedules the eMBB data transmission.

Particularly, the UE can determine the DCI format detected by the UE (that is, the DCI format of the DCI detected by the UE) and the number of bits of the DCI format according to the DCI format of the DCI carried in the PDCCH that schedules the PDSCH and PUSCH.

Here, the priority of the DCI format can be determined according to the service types of the PDSCH and the PUSCH scheduled by the DCI, and the service types of the PDSCH and the PUSCH can be determined according to types of data (for example, the URLLC data or the eMBB data) transmitted through the PDSCH and the PUSCH. In the embodiment of the present disclosure, determining the priority of the DCI format according to the service type is only for an explanation purpose, which is not used for limiting the protection scope of the present disclosure, that is, it is not excluded that another factor can enable the DCI formats with different numbers of bits to have different priorities, that is to say, determining the priority of the DCI format according to other factor is available, for example, configuring the priority of the DCI format through a high layer signaling.

Here, the priority of the DCI format can indicate the priority for not changing the number of bits of the DCI format, that is to say, when it is necessary to enable the number of the DCI formats with different numbers of bits to be reduced by increasing or reducing the number of bits of the DCI format, the number of bits of the DCI format having a low priority is changed prier to changing of the number of bits of the DCI format having a high priority. For example, a priority of a DCI format of a DCI in the PDCCH that schedules URLLC data transmission is high, and a priority of a DCI format of a DCI in the PDCCH that schedules the eMBB data transmission is low.

After reducing the detected DCI formats with different numbers of bits, the detected DCI formats with different numbers of bits can be determined, the number of detections corresponding to each DCI format can be determined; and after limiting the number of detections of the PDCCH and the number of detections of the non-overlapped CCE, the number of detections of the PDCCH and the number of detections of the non-overlapped CCE can be determined. In this case, receiving the DCI can be performed according to the determined number of detections (for example, the number of detections of the DCI formats with different numbers of bits and/or the determined PDCCH, and the number of detections of the non-overlapped CCE), that is, performing step 530. Further detailed explanations are conducted on the technical solution of adjusting the DCI format and the number of detections of the present disclosure through preferable embodiments.

Embodiment I

In the present embodiment, the base station configures, for each UE, a plurality of DCI formats (for example, a CSS-based DCI format (called the DCI format of the CSS for short) 0-0, a DCI format 1-0 of the CSS, a DCI format 2-0 of the CSS, a DCI format 2-1 of the CSS, a DCI format 2-2 of the CSS, a DCI format 2-3 of the CSS, a US S-based DCI format (called the DCI format of the USS for short) 0-0, a DCI format 1-0 of the USS, a DCI format 0-1 of the USS, a DCI format 1-1 of the USS, a newly added a DCI format 0-x (for scheduling the PUSCH that introduces URLLC data transmission), and a newly added DCI format 1-x (for scheduling the PDSCH that introduces URLLC data transmission)) that need to be detected, and determines the total number of bits of each DCI format (the total numbers of bits of different DCI formats may be different) according to the number of bits required (or configured) by each information domain in each DCI format.

At present, as for a New Radio (NR) system, a maximum number of different DCI formats (the numbers of bits of different DCI formats are different) detected in each serving cell by the UE is 4, and a maximum number of the DCI formats with different numbers of bits, which are scrambled with C-RNTI and are detected in each serving cell by the UE, is 3. When the serving cell introduces the URLLC service transmission, the detection ability of the serving cell may be enhanced, for example, a maximum number of different DCI formats detected by the UE in each serving cell, which introduces the URLLC service transmission, is N, and a maximum of different DCI formats which are scrambled with C-RNTI and are detected by the UE in each serving cell, which introduces the URLLC service transmission, is M, wherein N and M are integers, N and M can be configured through the high layer signaling or determined by presetting through a protocol, and wherein N≥4, and M≥3.

As for the NR system, the number of bits of the DCI format can be changed through at least one of (also called aligning the number of bits of a part of the DCI formats):

1. Enabling a number of bits of a DCI format 0-0 of a USS and a number of bits of a DCI format 1-0 of the CSS to be the same by increasing or reducing the number of bits of the DCI format;

2. Enabling a number of bits of a DCI format 0-0 of a USS and a number of bits of a DCI format 1-0 of the CSS to be the same by increasing or reducing the number of bits of the DCI format;

3. When the number of bits of the DCI format 0-1 of the USS is the same as the number of bits of the DCI format 0-0 of the USS or the number of bits of the DCI format 1-0 of the USS, increasing the number of bits of the DCI format 0-1 of the USS by 1 bit, to enable the number of bits of the DCI format 0-1 of the USS to be different from the number of bits of the DCI format 0-0 of the USS or the number of bits of the DCI format 1-0 of the USS, so as to distinguish the DCI format 0-1 of the USS and the DCI format 0-0 of the USS or the DCI format 1-0 of the USS, wherein a value of the added 1 bit is "0" or another possible numerical value; and 4. When the number of bits of the DCI format 1-1 of the USS is the same as the number of bits of the DCI format 0-0 of the USS or the number of bits of the DCI format 1-0 of the USS, increasing the number of bits of the DCI format 1-1 of the USS by 1 bit, to enable the number of bits of the DCI format 1-1 of the USS to be different from the number of bits of the DCI format 0-0 of the USS or the number of bits of the DCI format 1-0 of the USS, so as to distinguish the DCI format 1-1 of the USS and the DCI format 0-0 of the USS or the DCI format 1-0 of the USS, a value of the added 1 bit being "0" or another possible numerical value, wherein when the number of different DCI formats detected by the UE in each serving cell is smaller than or equal to 4, and the number of different DCI formats which are scrambled with the C-RNTI and are detected by the UE in the each serving cell is smaller than or equal to 3, then the aligning the number of bits of the DCI format is completed, or it is called completing the aligning the number of bits of the DCI format.

When, through the above processes (1 to 4), the number of different DCI formats detected by the UE in each serving cell is still not enabled to be smaller than or equal to 4, the number of different DCI formats which are scrambled with the C-RNTI and are detected by the UE in the each serving cell is not enabled to be smaller than or equal to 3, the detected number of different DCI formats can be reduced by enabling the number of bits of the DCI format 0-0 of the USS or the number of bits of the DCI format 1-0 of the USS to be the same as the number of bits of the DCI format 0-0 of the CSS or the number of bits of the DCI format 1-0 of the CSS.

The DCI detecting or receiving process (namely the aligning process with respect to the number of bits of the DCI format) with respect to the serving cell which does not introduce the URLLC service transmission is described above, and regarding the serving cell which introduces the URLLC service transmission, through corresponding process, it can be obtained that: a maximum number of different DCI formats detected by the UE in each serving cell can be enabled to be N, and a maximum number of different DCI formats which are scrambled with C-RNTI and are detected by the UE in each serving cell can be enabled to be M, wherein N≥4, and M≥3. According to various embodiments, the aligning process can be referred as a DCI size alignment. If necessary, padding or truncation shall be applied to the DCI formats according to one or more steps described in the present disclosure.

The corresponding process can include at least one of:

1. Enabling a number of bits of a DCI format 0-0 of a USS and a number of bits of a DCI format 1-0 of the CSS to be the same by increasing or reducing the number of bits of the DCI format;

2. Enabling a number of bits of a DCI format 0-0 of a USS and a number of bits of a DCI format 1-0 of the CSS to be the same by increasing or reducing the number of bits of the DCI format;

3. When the number of bits of the DCI format 0-1 of the USS is the same as the number of bits of the DCI format 0-0 of the USS or the number of bits of the DCI format 1-0 of the USS, increasing the number of bits of the DCI format 0-1 of the USS by 1 bit, to enable the number of bits of the DCI format 0-1 of the USS to be different from the number of bits of the DCI format 0-0 of the USS or the number of bits of the DCI format 1-0 of the USS, so as to distinguish the DCI format 0-1 of the USS from the DCI format 0-0 of the USS or the DCI format 1-0 of the USS, wherein a value of the added 1 bit is "0" or another possible numerical value; and 4. When the number of bits of the DCI format 1-1 of the USS is the same as the number of bits of the DCI format 0-0 of the USS or the number of bits of the DCI format 1-0 of the USS, increasing the number of bits of the DCI format 1-1 of the USS by 1 bit, to enable the number of bits of the DCI format 1-1 of the USS to be different from the number of bits of the DCI format 0-0 of the USS or the number of bits of the DCI format 1-0 of the USS, so as to distinguish the DCI format 1-1 of the USS from the DCI format 0-0 of the USS or the DCI format 1-0 of the USS, wherein a value of the added 1 bit is "0" or another possible numerical value; and wherein when the number of different DCI formats detected by the UE in each serving cell is smaller than or equal to M, and the number of different DCI formats which are scrambled with the C-RNTI and are detected by the UE in the each serving cell is smaller than or equal to N, then the corresponding process is completed, or it is called completing the process.

With respect to the serving cell which introduces the URLLC service transmission, when, through the above processes (1 to 4), the maximum number of different DCI formats detected by the UE in each serving cell still cannot be enabled to be smaller than or equal to M, and the number of different DCI formats which are scrambled with the C-RNTI and are detected by the UE in the each serving cell cannot enabled to be smaller than or equal to N, then at least one of the following steps a to f can be performed.

As an example, the steps a to f can be performed according to an order, and this order can be preset by a protocol or be configured through a high layer signaling, for example, the order is: b→c→d→e→f→a. In the procedure of performing respective steps according to this order, when a condition (that is, the maximum number of different DCI formats detected by the UE in each serving cell is M, and the maximum number of different DCI formats which are scrambled with C-RNTI and are detected by the UE in each serving cell is N) is satisfied after a certain step, the subsequent steps are not performed.

The reason of setting the order of step a to be performed finally includes: as for the number of bits of the DCI format 0-x or the number of bits of the DCI format 1-x (the DCI format 0-x or the DCI format 1-x can be used for scheduling the PDSCH or the PUSCH for URLLC data transmission) in step a, requirements of the URLLC service for the time delay and reliability are high, and thus, the number of the DCI formats is reduced possibly without changing the number of bits of a DCI format, the DCI of which is used for scheduling the PDSCH or the PUSCH, the PDSCH or the PUSCH being used for URLLC data transmission, and such DCI can be called DCI for scheduling the URLLC data transmission for short. In the procedure of changing the number of bits of the DCI format based on the priority, setting the priority of the DCI format 0-x or 1-x of the DCI for scheduling the URLLC data transmission to be highest is also based on the above reason.

Step a: a number of bits of a DCI format 0-x of the USS and a number of bits of a DCI format 1-x of the USS are enabled to be the same by increasing or reducing the number of bits of the DCI format 0-x of the USS or the number of bits of the DCI format 1-x of the USS, and this step may affect the receiving performance of the DCI for scheduling the URLLC data transmission by the UE, thereby affecting the performance of transmitting the URLLC data by the UE;

Step b: the number of bits of the DCI format 0-1 of the USS is enabled to be the same as the number of bits of the DCI format 0-x or the number of bits of the DCI format 1-x of the USS by increasing or reducing the number of bits of the DCI format 0-1 of the USS, and this step may reduce the number of different DCI formats detected by the UE, but may affect the performance of transmitting the eMBB data by the UE;

Step c: the number of bits of the DCI format 1-1 of the USS is enabled to be the same as the number of bits of the DCI format 0-x or the number of bits of the DCI format 1-x of the USS by increasing or reducing the number of bits of the DCI format 1-1 of the USS, this step may reduce the number of different DCI formats detected by the UE, but may affect the performance of transmitting the eMBB data by the UE;

Step d: when a difference between the number of bits of the DCI format 0-1 of the USS and the number of bits of the DCI format 0-x or the number of bits of the DCI format 1-x of the USS is smaller or equal to a threshold value L (L can be configured through the high layer signaling, or preset through the protocol, or calculated based on a specific parameter, or obtained through other possible methods, which is not limited herein), the number of bits of the DCI format 0-1 of the USS is enabled to be the same as the number of bits of the DCI format 0-x of the USS or the number of bits of the DCI format 1-x of the USS by increasing or reducing the number of bits of the DCI format 0-1 of the USS, and this step may reduce the number of different DCI formats detected by the UE, but may affect the performance of transmitting the eMBB data by the UE; in addition, when a difference between the number of bits of the DCI format 0-1 of the USS and the number of bits of the DCI format 0-x of the USS or the number of bits of the DCI format 1-x of the USS is larger than the threshold value L, the UE stops detecting the DCI format 0-1 of the USS (for example, changing the number of bits of the DCI format 0-1 of the USS is stopped), because when the number of bits of the DCI format 0-1 of the USS is enabled to be the same as the number of bits of the DCI format 0-x of the USS or the number of bits of the DCI format 1-x of the USS by reducing the number of bits of the DCI format 0-1 of the USS, it may result in that the DCI format 0-1 of the USS cannot work (for example, cannot be used for scheduling the PUSCH or the PDSCH);

Step e: when a difference between the number of bits of the DCI format 1-1 of the USS and the number of bits of the DCI format 0-x or the number of bits of the DCI format 1-x of the USS is smaller or equal to a threshold value, the number of bits of the DCI format 1-1 of the USS is enabled to be the same as the number of bits of the DCI format 0-x of the USS or the number of bits of the DCI format 1-x of the USS by increasing or reducing the number of bits of the DCI format 1-1 of the USS, and this step may reduce the number of different DCI formats detected by the UE, but may affect the performance of transmitting the eMBB data by the UE; in addition, when a difference between the number of bits of the DCI format 1-1 of the USS and the number of bits of the DCI format 0-x of the USS or the number of bits of the DCI format 1-x of the USS is larger than the threshold value L, the UE stops detecting the DCI format 0-1 of the USS, because when the number of bits of the DCI format 1-1 of the USS is enabled to be the same as the number of bits of the DCI format 0-x of the USS or the number of bits of the DCI format 1-x of the USS by reducing the number of bits of the DCI format 1-1 of the USS, the DCI format 0-1 of the USS cannot work; and Step f: the number of bits of the DCI format 0-1 of the USS and the number of bits of the DCI format 1-1 of the USS are enabled to be the same by increasing or reducing the number of bits of the DCI format 0-1 of the USS or the number of bits of the DCI format 1-1 of the USS.

In the present embodiment, the complexity of blind detection of the DCI is reduced by reducing the number of different DCI formats (the numbers of bits of different DCI formats are different) detected by the UE in each serving cell, and it is especially ensured that after the DCI format for the URLLC data transmission is added, the complexity of blind detection of the DCI does not exceed the complexity supported by the UE. In addition, the number of blind detections with respect to at least one DCI format (the number of blind detection or detections of the DCI format indicates the number of blind detection (or detection) times performed on the DCI having the DCI format) can be reduced, so that a complexity of the total DCI blind detection of the UE does not exceed the complexity supported by the UE, and the number of blind detections of at least one DCI format can be reduced according to the above mentioned priority, for example, firstly reducing the number of blind detections of the DCI of the DCI format that is not used for the URLLC data transmission, and then reducing the number of blind detections of the DCI of the DCI format that is used for the URLLC data transmission (that is, the number of DCI blind detections of DCI, the DCI being used for scheduling the PUSCH or the PDSCH, and the PUSCH or the PDSCH being used for the URLLC data transmission), and the priority of the DCI format can be configured through the high layer signaling.

As an example, the priority, based on which the number of blind detections of the DCI format is reduced, is determined based on service types of the PDSCH and/or the PUSCH, and/or, a number of detections of the DCI format having a low priority is reduced prior to a number of blind detections of the DCI format having a high priority, and when a blind detection complexity of the DCI reaches a predetermined degree after the number of blind detections of the DCI format is reduced, reducing the number of blind detections of the DCI format is stopped, and/or, a priority of a DCI format of the DCI that schedules the PUSCH or the PDSCH for an URLLC data transmission is higher than a priority of a DCI format of the DCI that schedules the PUSCH or the PDSCH for the eMBB data transmission.

Embodiment II

In order to ensure the blind detection complexity of the DCI of the UE is not too large (for example, ensuring the detection complexity of the DCI is lower than a maximum blind detection complexity of the DCI supported by the UE), the number of detections of the PDCCH of each UE can be limited. As for one serving cell, a maximum number of times for the UE to detect the PDCCHs with different sizes at each time slot is related to a sub-carrier spacing configuration ($\mu$) of the PDCCH, and particularly, as for each serving cell, a correspondence between the maximum number of times $M_{PDCCH}^{max,slot,\mu}$ of PDCCHs with different detected sizes at each time slot and the sub-carrier spacing configuration ($\mu$) of the PDCCH is shown in Table 1.

TABLE 1

| $\mu$ | $M_{PDCCH}^{max,slot,\mu}$ |
|---|---|
| 0 | 44 |
| 1 | 36 |
| 2 | 22 |
| 3 | 20 |

In addition, a maximum number of times for the UE to detect the non-overlapped CCE can also be limited, and as for one serving cell, the maximum number of times for the UE to detect the non-overlapped CCE at each time slot is related to the sub-carrier spacing configuration ($\mu$) of the PDCCH. Particularly, as for each serving cell, the maximum number of times $C_{PDCCH}^{max,slot,\mu}$ for detecting the non-overlapped CCE at each time slot and the sub-carrier spacing configuration ($\mu$) of the PDCCH is shown in Table 2.

TABLE 2

| $\mu$ | $C_{PDCCH}^{max,slot,\mu}$ |
|---|---|
| 0 | 56 |
| 1 | 56 |
| 2 | 48 |
| 3 | 32 |

The maximum number of times for the UE to detect the PDCCH and the maximum number of times for the UE to detect the non-overlapped CCE are determined in the case where the UE configures one serving cell.

In the case where the UE configures a Carrier Aggregation (CA) or a Dual-connectivity (DC), a CA ability or a DC ability of the UE at most supports a predetermined number (for example, 4) of the downlink serving cells, and the UE configures a number of the downlink serving cells, the number being smaller than or equal to the predetermined number, the maximum number of detections $M_{PDCCH}^{max,slot,\mu}$ of PDCCHs with different sizes and the maximum number of times $C_{PDDCH}^{max,slot,\mu}$ of the non-overlapped CCE, at each time slot of each downlink serving cell by the UE, are determined according to the sub-carrier spacing configuration $\mu$ of each downlink serving cell, respectively, that is, those are determined according to a predetermined correspondence between the sub-carrier spacing configuration $\mu$ and $M_{PDCCH}^{max,slot,\mu}$ and $C_{PDCCH}^{max,slot,\mu}$ of each downlink serving cell provided in the above Table 1 and Table 2, respectively.

In the case where the UE configures the CA or DC, the CA ability of the UE or the DC ability of the UE supports a number of the downlink serving cells which is larger than the predetermined number (for example, 4), the ability of detecting the PDCCH by the UE indicated through a parameter (for example, pdcch-BlindDetectionCA) by the UE is $N_{cells}^{cap}$ downlink serving cells ($N_{cells}^{cap}$ is larger than or equal to the predetermined number, for example, 4), and the UE configures $N_{cells}^{DL,\mu}$ downlink serving cells of which the sub-carrier spacing configuration is $\mu$, a sum of the maximum number of detections of the PDCCHs with different sizes at each time slot in $N_{cells}^{cap}$ downlink serving cells, of which the sub-carrier spacing configuration is $\mu$, is $M_{PDCCH}^{total,slot,\mu} = \lfloor N_{cells}^{cap} \cdot M_{PDCCH}^{max,slot,\mu} \cdot N_{cells}^{DL,\mu} / \Sigma_{j=0}^{3} N_{cells}^{DL,j} \rfloor$, a sum of the maximum number of detections of the non-overlapped CCE at each time slot in the serving cells, of which the sub-carrier spacing configuration is $\mu$, is $C_{PDCCH}^{total,slot,\mu} = \lfloor N_{cells}^{cap} \cdot C_{PDCCH}^{max,slot,\mu} \cdot N_{cells}^{DL,\mu} / \Sigma_{j=0}^{3} N_{cells}^{DL,j} \rfloor$, wherein $N_{cells}^{DL,\mu}$ indicates the number of the downlink serving cells configured by the UE, the sub-carrier spacing configuration of these downlink serving cells is $\mu$, $N_{cells}^{DL,j}$ indicates the number of the downlink serving cells when the sub-carrier spacing configuration is $\mu=j$ from among the downlink serving cells configured by the UE.

It is described above that each serving cell is only configured with one downlink Bandwidth Part (BWP), or although each serving cell is configured with a plurality of BWPs, at the same time, there is only one activated downlink BWP, and the above $\mu$ is the sub-carrier spacing configuration of the activated downlink BWP.

In each serving cell that introduces the URLLC service transmission, in order to satisfy requirements of the URLLC service for the time delay and reliability, the maximum number of detections of the PDCCHs with different sizes (that is, the DCI format with different numbers of bits) for the detection of the UE at each time slot and the maximum number of detections of the non-overlapped CCE for the detection of the UE can be increased, for example, the maximum number of detections of the PDCCHs with different sizes at each time slot is shown in Table 3, and the maximum number of detections of the non-overlapped CCE is shown in Table 4.

The maximum number of detections of the PDCCH and the maximum number of detections of the non-overlapped CCE for the detection of the UE, which are shown in Table 3 and Table 4, are determined in the case where the UE configures one serving cell, and the serving cell introduces the URLLC service transmission.

TABLE 3

| μ | $M_{PDCCH}^{max,slot,\mu}\_1$ |
|---|---|
| 0 | 44 + m0 |
| 1 | 36 + m1 |
| 2 | 22 + m2 |
| 3 | 20 + m3 |

TABLE 4

| μ | $C_{PDCCH}^{max,slot,\mu}\_1$ |
|---|---|
| 0 | 56 + c0 |
| 1 | 56 + c1 |
| 2 | 48 + c2 |
| 3 | 32 + c3 |

When the UE configures the CA or the DC, and in the case where the number of downlink serving cells configured by the UE satisfies a certain condition, the operation of determining the maximum number of detections of the PDCCHs with different sizes at each time slot and the maximum number of detections of the non-overlapped CCE may include at least one of the following manners, so that the maximum number of detections with respect to the PDCCH and the maximum number of detections with respect to the non-overlapped CCE can be limited according to a determination result.

In the exemplary embodiment of the present disclosure, the above Table 1 to Table 4 can indicate the first correspondence to the fourth correspondence, respectively.

Manner 1:

In the case where the UE configures the CA or the DC, the UE supports a detection for the PDCCH that introduces the URLLC service transmission (that is, the PDCCH can introduce or support the URLLC service transmission, and the UE supports the detection for this PDCCH), the CA ability or the DC ability of the UE at most supports a predetermined number of downlink serving cells (for example, a number s, the number s is configured by a high layer signaling or preset by a protocol, or obtained by calculating the number of the cells that support the URLLC service transmission), and the UE configures a number of downlink serving cells which is smaller than or equal to the predetermined number, the maximum number of detections $M_{PDCCH}^{max,slot,\mu}$ PDCCHs with different sizes at each time slot of each downlink serving cell and the maximum number of times $C_{PDCCH}^{max,slot,\mu}$ of the non-overlapped CCE are determined according to the sub-carrier spacing configuration μ of each downlink serving cell and the introducing situation of the each serving cell for the URLLC service, respectively, that is, as for the cell that does not introduce the URLLC service, they are determined according to the predetermined correspondences between the sub-carrier spacing configuration μ and $M_{PDCCH}^{max,slot,\mu}$ and $C_{PDCCH}^{max,slot,\mu}$ of each downlink serving cell provided in the above Table 1 and Table 2, respectively, and they are $M_{PDCCH}^{max,slot,\mu}$ and $C_{PDCCH}^{max,slot,\mu}$ respectively; as for the cell that introduces the URLLC service, they are determined according to the predetermined correspondences between the sub-carrier spacing configuration μ and $M_{PDCCH}^{max,slot,\mu}\_1$ and $C_{PDCCH}^{max,slot,\mu}\_1$ of each downlink serving provided in the above Table 3 and Table 4, respectively, and they are $M_{PDCCH}^{max,slot,\mu}\_1$ and $C_{PDCCH}^{max,slot,\mu}\_1$, respectively.

Manner 2:

In the case where the UE configures the CA or the DC, the UE supports the detection for the PDCCH that introduces the URLLC service transmission, the CA ability or the DC ability of the UE at most supports a predetermined number of downlink serving cells with (for example, the number s), the number of the serving cells that support the URLLC service transmission configured by the UE is smaller than s1 (s1 is smaller than and equal to s), and the number of the serving cells configured by the UE is smaller than or equal to the predetermined number, the maximum number of detections $M_{PDCCH}^{max,slot,\mu}$ of PDCCHs with different sizes at each time slot of each downlink serving cell and the maximum number of times $C_{PDCCH}^{max,slot,\mu}$ of the non-overlapped CCE are determined according to the sub-carrier spacing configuration μ of each downlink serving cell and the introducing situation of the serving cell for the URLLC service, respectively, that is, as for the cell that does not introduce the URLLC service, they are determined according to the predetermined correspondences between the sub-carrier spacing configuration μ and $M_{PDCCH}^{max,slot,\mu}$ and $C_{PDCCH}^{max,slot,\mu}$ of each downlink serving cell provided in the above Table 1 and Table 2, respectively, and they are $M_{PDCCH}^{max,slot,\mu}$ and $C_{PDCCH}^{max,slot,\mu}$, respectively; as for the cell that introduces the URLLC service, they are determined according to the predetermined correspondences between the sub-carrier spacing configuration μ and $M_{PDCCH}^{max,slot,\mu}\_1$ and $C_{PDCCH}^{max,slot,\mu}\_1$ of each downlink serving provided in the above Table 3 and Table 4, respectively, and they are $M_{PDCCH}^{max,slot,\mu}\_1$ and $C_{PDCCH}^{max,slot,\mu}\_1$, respectively.

Manner 3:

In the case where the UE configures the CA or the DC, the UE supports the detection for the PDCCH that introduces the URLLC service transmission, the CA ability or the DC ability of the UE at most supports a predetermined number of downlink serving cells (for example, a number s), the number of the serving cells that support the URLLC service transmission configured by the UE is smaller than s1 (s1 is smaller than and equal to s), and the number of the serving cells that do not introduce the URLLC service transmission configured by the UE is smaller than or equal s2 (s2 is smaller than or equal to s), the maximum number of detections $M_{PDCCH}^{max,slot,\mu}$ of PDCCHs with different sizes at each time slot of each downlink serving cell and the maximum number of times $C_{PDCCH}^{max,slot,\mu}$ of the non-overlapped CCE are determined according to the sub-carrier spacing configuration μ of each downlink serving cell and whether the serving cell introduces the URLLC service, respectively, that is, as for the cell that does not introduce the URLLC service, they are determined according to the predetermined correspondences between the sub-carrier spacing configuration μ and $M_{PDCCH}^{max,slot,\mu}$ and $C_{PDCCH}^{max,slot,\mu}$ of each downlink serving cell provided in the above Table 1 and Table 2, respectively, and they are $M_{PDCCH}^{max,slot,\mu}$ and $C_{PDCCH}^{max,slot,\mu}$, respectively; as for the cell that introduces the URLLC service, they are determined according to the predetermined correspondences between the sub-carrier spacing configuration μ and $M_{PDCCH}^{max,slot,\mu}\_1$ and $C_{PDCCH}^{max,slot,\mu}\_1$ of each downlink serving cell provided in the above Table 3 and Table 4, respectively, and they are $M_{PDCCH}^{max,slot,\mu}\_1$ and $C_{PDCCH}^{max,slot,\mu}\_1$, respectively.

Manner 4:

In the case where the UE configures the CA or the DC, the UE supports the detection for the PDCCH that introduces the URLLC service transmission, the CA ability or the DC ability of the UE at most supports a predetermined number of downlink serving cells (for example, a number s), the number of the serving cells that support the URLLC service transmission configured by the UE is h1, the number of the serving cells that do not introduce the URLLC service transmission configured by the UE is h2, when h1*(1+α)+h2 (α is a factor, α can be configured by a high layer signaling, or preset through the protocol, or obtained through calculation based on the parameter, or obtained through other methods, which is not limited herein) is smaller than or equal to the predetermined number of the downlink serving cells, or h1*a_1+h2 (a_1 is a factor, a_1 can be configured by the high layer signaling, or preset through the protocol, or obtained through calculation based on a parameter, or obtained through other methods, which is not limited herein) is smaller than or equal to the predetermined number of (for example, the number s) the downlink serving cells, the maximum number of detections $M_{PDCCH}^{max,slot,\mu}$ of PDCCHs with different sizes at each time slot of each downlink serving cell and the maximum number of times $C_{PDCCH}^{max,slot,\mu}$ of the non-overlapped CCE are determined according to the sub-carrier spacing configuration μ of each downlink serving cell and whether the serving cell introduces the URLLC service, respectively, that is, as for the cell that does not introduce the URLLC service, they are determined according to the predetermined correspondences between the sub-carrier spacing configuration μ and $M_{PDCCH}^{max,slot,\mu}$ and $C_{PDCCH}^{max,slot,\mu}$ of each downlink serving cell provided in the above Table 1 and Table 2, respectively, and they are $M_{PDCCH}^{max,slot,\mu}$ and $C_{PDCCH}^{max,slot,\mu}$, respectively; as for the cell that introduces the URLLC service, they are determined according to a predetermined correspondence between the sub-carrier spacing configuration μ and $M_{PDCCH}^{max,slot,\mu}\_1$ and $C_{PDCCH}^{max,slot,\mu}\_1$ of each downlink serving cell provided in the above Table 3 and Table 4, respectively, and they are $M_{PDCCH}^{max,slot,\mu}\_1$ and $C_{PDCCH}^{max,slot,\mu}\_1$, respectively.

In the case where the UE configures the CA or the DC, the number of the downlink serving cells configured by the UE does not satisfy a certain condition (the certain condition includes any one of the above described conditions, for example, the condition is: the CA ability or the DC ability of the UE at most supports the predetermined number of (for example, the number s, which is configured by the high layer signaling or preset by the protocol, or obtained by calculating the number of the cells that introduce the PDCCH for the URLLC service transmission) downlink serving cells), it is to determine the maximum number of detections of the PDCCHs with different sizes detected by the UE at each time slot and the maximum number of detections of the non-overlapped CCE detected by the UE at each time slot includes at least one of the following methods.

Method 1:

In the case where the UE configures the CA or DC, the UE supports the detection of the PDCCH for the URLLC service transmission, the CA ability of the UE or the DC ability of the UE supports a number of the downlink serving cells which is larger than the predetermined number (for example, s), the detection ability of the PDCCH indicated to the UE through a parameter (for example, pdcch-BlindDetectionCA) is $N_{cells}^{cap}$ downlink serving cells ($N_{cells}^{cap}$ is larger than or equal to the predetermined number, for example, s), and the UE configures $N_{cells}^{DL,\mu}$ downlink serving cells of which the sub-carrier spacing configuration is μ, a sum of the maximum number of detections of the PDCCHs with different sizes at each time slot in $N_{cells}^{DL,\mu}$ serving cells, of which the sub-carrier spacing configuration is μ, is $M_{PDCCH}^{total,slot,\mu}=\lfloor N_{cells}^{cap} \cdot M_{PDCCH}^{max,slot,\mu} \cdot N_{cells}^{DL,\mu}/\Sigma_{j=0}^{3}N_{cells}^{DL,j}\rfloor$, the maximum number of detections of the PDCCHs with different sizes of each downlink serving cell at each time slot, of which the sub-carrier spacing configuration is μ, is MμPDCCH=min $(M_{PDCCH}^{max,slot,\mu}, M_{PDCCH}^{total,slot,\mu})$, a sum of the maximum number of detections of the non-overlapped CCE of $N_{cells}^{DL,\mu}$ serving cells at each time slot, of which the sub-carrier spacing configuration is μ, is $C_{PDCCH}^{total,slot,\mu}=\lfloor N_{cells}^{cap} \cdot C_{PDCCH}^{max,slot,\mu} \cdot N_{cells}^{DL,\mu}/\Sigma_{j=0}^{3}N_{cells}^{DL,j}\rfloor$, the maximum number of detections of the non-overlapped CCE of each serving cell at each time slot, of which the sub-carrier spacing configuration is μ, is CμPDCCH=min $(C_{PDCCH}^{max,slot,\mu}, C_{PDCCH}^{total,slot,\mu})$, and the method does not increase the number of detections for the PDCCHs with different sizes at each time slot and the maximum number of detections of the non-overlapped CCE at each time slot, in the serving cell that introduces the URLLC service transmission.

Method 2:

In the case where the UE configures the CA or the DC, the UE supports the detection of the PDCCH that introduces the URLLC service transmission, the CA ability of the UE or the DC ability of the UE supports a number of downlink serving cells which is larger than the predetermined number (for example, s), the ability of the UE for detecting the PDCCH indicated through a parameter (for example, pdcch-BlindDetectionCA) is $N_{cells}^{cap}$ downlink serving cells ($N_{cells}^{cap}$ is larger than or equal to the predetermined number, for example, s), and the UE configures $N_{cells}^{DL,\mu}$ downlink serving cells of which the sub-carrier spacing configuration is μ, a sum of the maximum number of detections of the PDCCHs with different sizes at each time slot in $N_{cells}^{DL,\mu}$ serving cells, of which the sub-carrier spacing configuration is μ, is $M_{PDCCH}^{total,slot,\mu}=\lfloor N_{cells}^{cap} \cdot M_{PDCCH}^{max,slot,\mu} \cdot N_{cells}^{DL,\mu}/\Sigma_{j=0}^{3}N_{cells}^{DL,j}\rfloor$, and as for the serving cell of the PDCCH that introduces the URLLC service transmission, the maximum number of detections of the PDCCHs with different sizes at each time slot in each downlink serving cell, of which the sub-carrier spacing configuration is μ, is MμPDCCH=min$\{M_{PDCCH}^{max,slot,\mu}\_1, M_{PDCCH}^{total,slot,\mu}\}$; as for the serving cell that detects the PDCCH which does not introduce the URLLC service transmission, the maximum number of detections of the PDCCHs with different sizes at each time slot in each downlink serving cell, of which the sub-carrier spacing configuration is μ, is MμPDCCH=min$\{M_{PDCCH}^{max,slot,\mu}, M_{PDCCH}^{total,slot,\mu}\}$. A sum of the maximum number of detections of the non-overlapped CCE at each time slot in $N_{cells}^{DL,\mu}$ serving cells, of which the sub-carrier spacing configuration is μ, is $C_{PDCCH}^{total,slot,\mu}=\lfloor N_{cells}^{cap} \cdot C_{PDCCH}^{max,slot,\mu} \cdot N_{cells}^{DL,\mu}/\Sigma_{j=0}^{3}N_{cells}^{DL,j}\rfloor$, and as for the serving cell that introduces the URLLC service transmission, the maximum number of detections of the non-overlapped CCE at each time slot in each downlink serving cell, of which the sub-carrier spacing configuration is μ, is CμPDCCH=min$\{C_{PDCCH}^{max,slot,\mu}\_1, C_{PDCCH}^{total,slot,\mu}\}$; as for the serving cell that does not introduce the URLLC service transmission, the maximum number of detections of the non-overlapped CCE at each time slot in each serving cell, of which the sub-carrier spacing configuration is μ, is max,slot,μ total,slot,μ CμPDCCH=min$\{C_{PDCCH}^{max,slot,\mu}, C_{PDCCH}^{total,slot,\mu}\}$.

Method 3:

In the case where the UE configures the CA or the DC, the UE supports the detection of the PDCCH that introduces the URLLC service transmission, the CA ability of the UE or the DC ability of the UE supports a number of downlink serving cells which is larger than a predetermined number (for example, s), the ability for the UE to detect the PDCCH indicated through a parameter (for example, pdcch-BlindDetectionCA) is $N_{cells}^{cap}$ downlink serving cells ($N_{cells}^{cap}$ is larger than or equal to the predetermined number, for example, s), and the UE configures $N_{cells}^{DL,\mu}$ downlink serving cells of which the sub-carrier spacing configuration is $\mu$, a sum of the maximum number of detections of the PDCCHs with different sizes at each time slot in $N_{cells}^{DL,\mu}$ serving cells, of which the sub-carrier spacing configuration is $\mu$, is related to the following contents: whether there is a serving cell that needs to detect the PDCCH for the URLLC service transmission from among $N_{cells}^{DL,\mu}$ serving cells of which the sub-carrier spacing configuration is for example, $M_{PDCCH}^{total,slot,\mu}=\lfloor N_{cells}^{cap} \cdot M_{PDCCH}^{max,slot,\mu} \cdot N_{cells}^{DL,\mu} \cdot \gamma^\mu \rfloor / \Sigma_{j=0}^{3} N_{cells}^{DL,j} \cdot \gamma^j$, as for a case where there is not the serving cell that detects the PDCCH for the URLLC service transmission from among $N_{cells}^{DL,\mu}$ downlink serving cells, of which the sub-carrier spacing configuration is $\mu$, $\gamma^\mu=1$, and as for a case where there is at least one serving cell that detects the PDCCH for the URLLC service transmission from among $N_{cells}^{DL,\mu}$ downlink serving cells of which the sub-carrier spacing configuration is $\mu$, $\gamma^\mu \geq 1$. As for the serving cell that detects the PDCCH which introduces the URLLC service transmission, the maximum number of detections of the PDCCHs with different sizes at each time slot in each serving cell, of which the sub-carrier spacing configuration is $\mu$, is $M\mu PDCCH=\min\{M_{PDCCH}^{max,slot,\mu}, M_{PDCCH}^{total,slot,\mu}\}$; as for the serving cell that detects the PDCCH which does not introduce the URLLC service transmission, the maximum number of detections of the PDCCHs with different sizes at each time slot in each serving cell, of which the sub-carrier spacing configuration is $\mu$, is $M\mu PDCCH=\min\{M_{PDCCH}^{max,slot,\mu}-1, M_{PDCCH}^{total,slot,\mu}\}$, wherein the value of $\gamma^\mu$ is configured by the high layer signaling or preset by the protocol, or obtained by calculating a number, such as the number of cells that detect the PDCCH for the URLLC service transmission.

The sum of maximum number of detections of the non-overlapped CCE at each time slot in $N_{cells}^{DL,\mu}$ serving cells, of which the sub-carrier spacing configuration is $\mu$, is related to whether there is a serving cell that detects the PDCCH for the URLLC service transmission from among $N_{cells}^{DL,\mu}$ serving cells of which the sub-carrier spacing configuration is $\mu$, for example, $D_{PDCCH}^{total,slot,\mu}=\lfloor N_{cells}^{cap} \cdot C_{PDCCH}^{max,slot,\mu} \cdot N_{cells}^{DL,\mu} \cdot \beta^\mu \rfloor / \Sigma_{j=0}^{3} N_{cells}^{DL,j} \cdot \beta^j$, as for a case where there is not the serving cell that detects the PDCCH for the URLLC service transmission from among $N_{cells}^{DL,\mu}$ downlink serving cells, of which the sub-carrier spacing configuration is $\mu$, $\beta^\mu=1$, and as for a case where there is at least one serving cell that detects the PDCCH for the URLLC service transmission from among $N_{cells}^{DL,\mu}$ downlink serving cells, of which the sub-carrier spacing configuration is $\mu$, $\beta^\mu \geq 1$. As for the serving cell that detects the PDCCH which introduces the URLLC service transmission, the maximum number of detections of the non-overlapped CCE at each time slot in each serving cell, of which the sub-carrier spacing configuration is $\mu$, is $C\mu PDCCH$ $\min\{C_{PDCCH}^{max,slot,\mu}-1, C_{PDCCH}^{total,slot,\mu}\}$; as for the serving cell that detects the PDCCH which does not introduce the URLLC service transmission, the maximum number of detections of the non-overlapped CCE at each time slot in wach serving cell, of which the sub-carrier spacing configuration is $\mu$, is $C\mu PDCCH=\min\{C_{PDCCH}^{max,slot,\mu}, C_{PDCCH}^{total,slot,\mu}\}$, wherein $\beta^\mu$ is configured by the high layer signaling or preset by the protocol, or obtained by calculating the number of cells that detect the PDCCH for the URLLC service transmission.

Method 4:

In the case where the UE configures the CA or the DC, the UE supports the detection of the PDCCH that introduces the URLLC service transmission, the CA ability of the UE or the DC ability of the UE supports a number of downlink serving cells which is larger than the predetermined number (for example, s), the ability for the UE to detect the PDCCH indicated through a parameter (for example, pdcch-BlindDetectionCA) is $N_{cells}^{cap}$ downlink serving cells ($N_{cells}^{DL,\mu}$ is larger than or equal to the predetermined number, for example, s), and the UE configures downlink serving cells of which the sub-carrier spacing configuration is $\mu$, a sum of the maximum number of detections of the PDCCHs with different sizes at each time slot in $N_{cells}^{DL,\mu}$ serving cells, of which the sub-carrier spacing configuration is $\mu$, is related to the following contents: whether there is a serving cell that needs to detect the PDCCH for the URLLC service transmission from among $N_{cells}^{DL,\mu}$ serving cells of which the sub-carrier spacing configuration is $\mu$, for example, $M_{PDCCH}^{total,slot,\mu}=\lfloor N_{cells}^{cap} \cdot M_{PDCCH}^{max,slot,\mu} \cdot (N_{cells}^{DL,\mu,non-URLLC}+N_{cells}^{DL,\mu,URLLC} \cdot \gamma^\mu) \rfloor / \Sigma_{j=0}^{3} (N_{cells}^{DL,j,non-URLLC}+N_{cells}^{DL,j,URLLC} \cdot \gamma^j)$.

As for a case where the number of the serving cells which introduce the detection of the PDCCH for the URLLC service transmission, from among $N_{cells}^{DL,\mu}$ downlink serving cells of which the sub-carrier spacing configuration is $\mu$, is $N_{cells}^{DL,j,URLLC}$, and as for a case where the number of the serving cells which do not introduce the detection of the PDCCH for the URLLC service transmission, from among $N_{cells}^{DL,\mu}$ downlink serving cells of which the sub-carrier spacing configuration is $\mu$, is $N_{cells}^{DL,j,non-URLLC}$, $\gamma^\mu \geq 1$. As for the serving cell that detects the PDCCH which introduces the URLLC service transmission, the maximum number of detections of the PDCCHs with different sizes at each time slot in the serving cell of which the sub-carrier spacing configuration is $\mu$ is $M\mu PDCCH=\min\{M_{PDCCH}^{max,slot,\mu}-1, M_{PDCCH}^{total,slot,\mu}\}$, and as for the serving cell that detects the PDCCH which does not introduce the URLLC service transmission, the maximum number of detections of the PDCCHs with different sizes at each time slot in the serving cell of which the sub-carrier spacing configuration is $\mu$ is $M\mu PDCCH=\min\{M_{PDCCH}^{max,slot,\mu}, M_{PDCCH}^{total,slot,\mu}\}$, wherein $\gamma^\mu$ is configured by the high layer signaling or preset by the protocol.

The sum of the maximum number of detections of the non-overlapped CCE at each time slot in $N_{cells}^{DL,\mu}$ serving cells of which the sub-carrier spacing configuration is $\mu$ is related to whether there is a serving cell that detects the PDCCH for the URLLC service transmission from among $N_{cells}^{DL,\mu}$ serving cells of which the sub-carrier spacing configuration is $\mu$.

For example, $C_{PDCCH}^{total,slot,\mu}=\lfloor N_{cells}^{cap} \cdot C_{PDCCH}^{max,slot,\mu} \cdot (N_{cells}^{DL,\mu,non-URLLC}+N_{cells}^{DL,\mu,URLLC} \cdot \beta^\mu) \rfloor / \Sigma_{j=0}^{3} (N_{cells}^{DL,j,non-URLLC}+N_{cells}^{DL,j,URLLC} \cdot \beta^j)$.

As for a case where the number of the serving cells that detects the PDCCH for the URLLC service transmission, from among $N_{cells}^{DL,\mu}$ downlink serving cells of which the sub-carrier spacing configuration is $\mu$, is $N_{cells}^{DL,j,URLLC}$, and as for a case where the number of the serving cells that detects the PDCCH for the URLLC service transmission, from among $N_{cells}^{DL,\mu}$ downlink serving cells of which the sub-carrier spacing configuration is $\mu$, is $N_{cells}^{DL,j,non-URLLC}$, $\beta^\mu \geq 1$.

As for the serving cell that detects the PDCCH which introduces the URLLC service transmission, the maximum number of detections of the non-overlapped CCE at each time slot in each serving cell of which the sub-carrier spacing configuration is µ is CµPDCCH=min$\{C_{PDCCH}^{max,slot,\mu}\_1, C_{PDCCH}^{total,slot,\mu}\}$; and as for the serving cell that detects the PDCCH which does not introduce the URLLC service transmission, the maximum number of detections of the non-overlapped CCE at each time slot in each serving cell of which the sub-carrier spacing configuration is µ is CµPDCCH=min$\{C_{PDCCH}^{max,slot,\mu}, C_{PDCCH}^{total,slot,\mu}\}$, wherein $\beta^{\mu}$ is configured by the high layer signaling or preset by the protocol.

Method 5:

In the case where the UE configures the CA or the DC, the UE supports the detection for the PDCCH that introduces the URLLC service transmission, the CA ability or the DC ability of the UE supports a number of downlink serving cells which is larger than the predetermined number (for example, s), and the ability for the UE to detect the PDCCH indicated through a parameter (for example, pdcch-BlindDetectionCA) is $N_{cells}^{cap}$ downlink serving cells, the maximum number of detections of the PDCCH in the serving cell that detects the PDCCH which introduces the URLLC service transmission is satisfied first, the rest abilities of detecting the PDCCH by the UE are then allocated to the serving cell that detects the PDCCH which does not introduce the URLLC service transmission, for example, the ability of detecting the PDCCH by the UE is $N_{cells}^{cap}$ downlink serving cells, the number of serving cells that detect the PDCCH which introduces the URLLC service transmission is p_URLLC, and the ability of detecting the PDCCH allocated to the serving cells that detect the PDCCH which introduces the URLLC service transmission is p_URLLC×α, wherein α is a weight factor for detecting the PDCCH which introduces the URLLC service transmission, and can be preset by the protocol or configured by the high layer signaling, the rest ability of detecting the PDCCH is $N_{cells}^{cap}$-p_URLLC×α, and the rest ability of detecting the PDCCH is allocated to the serving cell that detects the PDCCH which does not introduce the URLLC service transmission and is configured to the UE. Adopting the method, by setting a proper weight factor α, and allocating, in a prior sequence, the PDCCH detection ability to the PDCCH scheduled with respect to a high priority service, the transmission of the high priority service can be ensured.

Method 6:

In the case where the UE configures the CA or the DC, the UE supports the detection for the PDCCH that introduces the URLLC service transmission, the CA ability or the DC ability of the UE supports a number of downlink serving cells which is larger than the predetermined number (for example, s), and the ability for the UE to detect the PDCCH indicated through a parameter (for example, pdcch-BlindDetectionCA) is $N_{cells}^{cap}$ downlink serving cells, first, the detection for the PDCCH that schedules the URLLC service in the serving cell that detects the PDCCH which introduces the URLLC service transmission is satisfied, the ability, which is for detecting the PDCCH that schedules the URLLC service, allocated to each cell is a1, the rest ability of detecting the PDCCH by the UE is then allocated to the configured serving cell, and the ability of detecting the PDCCH allocated to each cell is b1, the ability of detecting the PDCCH allocated to the serving cell that detects the PDCCH which introduces the URLLC service transmission is a1+b1, and the ability of detecting the PDCCH allocated to the serving cell that detects the PDCCH which does not introduce the URLLC service transmission is b1. For example, the ability of detecting the PDCCH by the UE is $N_{cells}^{cap}$ downlink serving cells, the number of serving cells that detect the PDCCH which introduces the URLLC service transmission is p_URLLC, the number of serving cells that detect the PDCCH which does not introduce the URLLC service transmission is p_non-URLLC, the ability of detecting the PDCCH that schedules the URLLC service allocated to each serving cell that detects the PDCCH which introduces the URLLC service transmission is a1, and the total ability of detecting the PDCCH that schedules the URLLC service, the ability being allocated to all serving cells that detect the PDCCH which introduces the URLLC service transmission, is p_URLLC×a1, the rest ability of detecting the PDCCH by the UE is $N_{cells}^{cap}$-p_URLLC×a1, the rest ability of detecting the PDCCH by the UE is allocated to the serving cell configured by the UE, and the ability of detecting the PDCCH allocated to each cell is b1=($N_{cells}^{cap}$-p_URLLC×a1)/(p_URLLC+p_non-URLLC), the ability of detecting the PDCCH allocated to the serving cell that detects the PDCCH which introduces the URLLC service transmission is a1+b1, and the ability of detecting the PDCCH allocated to the serving cell that detects the PDCCH which does not introduce the URLLC service transmission is b1. Adopting the method, by setting a proper factor a1, and allocating, in a prior sequence, the PDCCH detection ability to the PDCCH scheduled with respect to a high priority service, the transmission of the high priority service can be ensured.

The formulas used in the exemplary embodiments of the present disclosure are only used for explanation purpose, and are not used for limiting the protection scope of the present disclosure, and those skilled in the art can obtain corresponding results according to information such as configurations of the cells and the like, for example, calculated results of the formulas can be obtained by changing the formulas. For example, $M_{PDCCH}^{total,slot,\mu}$, $C_{PDCCH}^{total,slot,\mu}$ and the like can be calculated using formulas that are different from the above formulas according to the configurations of the cells.

According to an exemplary embodiment of the present disclosure, there is provided an apparatus of receiving DCI, which is shown in FIG. 6, an apparatus 600 may include: a detection time determining unit 610 configured to determine detections corresponding to a DCI detection ability of a UE and a number of detections corresponding to a DCI format; a detection time adjusting unit 620 configured to reduce the number of detections corresponding to the DCI format, wherein the reduced number of detections corresponding to the DCI format is smaller than or equal to the number of detections corresponding to the DCI detection ability; and a DCI receiving unit 630 configured to receive the DCI according to the reduced number of detections corresponding to the DCI format.

The detection time adjusting unit 620 may include a bit number changing unit and/or a detection time limiting unit. The bit number changing unit reduces a number of the detected DCI formats with different numbers of bits by changing a number of bits of at least one DCI format, to remove the number of detections corresponding to the DCI format removed by changing the number of bits, and the detection time limiting unit limits a number of detections of a PDCCH and a number of detections of a non-overlapped CCE.

As an example, as for a serving cell that introduces an URLLC service transmission, the bit number changing unit reduces the number of the detected DCI formats with different numbers of bits through at least one operation of: enabling a number of bits of a DCI format 0-0 of a CSS and a number of bits of a DCI format 1-0 of the CSS to be the same by increasing or reducing the number of bits of the DCI format; enabling a number of bits of a DCI format 0-0 of a USS and a number of bits of a DCI format 1-0 of the CSS to be the same by increasing or reducing the number of bits of the DCI format; when a number of bits of a DCI format 0-1 of the USS is the same as the number of bits of the DCI format 0-0 of the USS or a number of bits of a DCI format 1-0 of the USS, increasing the number of bits of the DCI format 0-1 of the USS by 1 bit, to enable the number of bits of the DCI format 0-1 of the USS to be different from the number of bits of the DCI format 0-0 of the USS or the number of bits of the DCI format 1-0 of the USS; when a number of bits of a DCI format 1-1 of the USS is the same as the number of bits of the DCI format 0-0 of the USS or the number of bits of the DCI format 1-0 of the USS, increasing the number of bits of the DCI format 1-1 of the USS by 1 bit, to enable the number of bits of the DCI format 1-1 of the USS to be different from the number of bits of the DCI format 0-0 of the USS or the number of bits of the DCI format 1-0 of the USS, wherein when the number of the DCI format with different number of bits detected in each serving cell by the UE is enabled, through the above operation, to be smaller than or equal to M, and a number of the DCI formats with different number of bits scrambled with the C-RNTI detected in the each serving cell by the UE is enabled, through the at least one step, to be smaller than or equal to N, then the reducing the number of the detected DCI formats with different number of bits is completed, and wherein N≥4, and M≥3.

As an example, as for the serving cell that introduces the URLLC service transmission, when the bit number changing unit, through the at least one operation, does not enable the number of the DCI format with different number of bits detected in each serving cell by the UE to be smaller than or equal to M and the number of the DCI formats with different number of bits scrambled with the C-RNTI detected in the each serving cell by the UE to be smaller than or equal to N, the following steps are performed in an order of step b, step c, step d, step e, step f and step a, until the number of the DCI formats with different number of bits detected in the each serving cell by the UE is smaller than or equal to M and the number of the DCI format with different number of bits scrambled with the C-RNTI detected in the each serving cell by the UE is smaller than or equal to N, and wherein N≥4, and M≥3: step a: enabling a number of bits of a DCI format 0-x of the USS and a number of bits of a DCI format 1-x of the USS to be the same by increasing or reducing the number of bits of the DCI format 0-x or the number of bits of the DCI format 1-x; step b: enabling the number of bits of the DCI format 0-1 of the USS and the number of bits of the DCI format 0-x of the USS or the number of bits of the DCI format 1-x of the USS to be the same by increasing or reducing the number of bits of the DCI format 0-1; step c: enabling the number of bits of the DCI format 1-1 of the USS and the number of bits of the DCI format 0-x of the USS or the number of bits of the DCI format 1-x of the USS to be the same by increasing or reducing the number of bits of the DCI format 1-1; step d: when a difference between the number of bits of the DCI format 0-1 of the USS and the number of bits of the DCI format 0-x of the USS or the number of bits of the DCI format 1-x of the USS is smaller or equal to a threshold value, enabling the number of bits of the DCI format 0-1 of the USS to be the same as the number of bits of the DCI format 0-x of the USS or the number of bits of the DCI format 1-x of the USS by increasing or reducing the number of bits of the DCI format 0-1 of the USS; and when a difference between the number of bits of the DCI format 0-1 of the USS and the number of bits of the DCI format 0-x of the USS or the number of bits of the DCI format 1-x of the USS is larger than the threshold value L, stopping detecting the DCI format 0-1 of the USS by the UE; step e: when a difference between the number of bits of the DCI format 1-1 of the USS and the number of bits of the DCI format 0-x of the USS or the number of bits of the DCI format 1-x of the USS is smaller or equal to a threshold value, enabling the number of bits of the DCI format 1-1 of the USS to be the same as the number of bits of the DCI format 0-x of the USS or the number of bits of the DCI format 1-x of the USS by increasing or reducing the number of bits of the DCI format 1-1 of the USS; and when a difference between the number of bits of the DCI format 1-1 of the USS and the number of bits of the DCI format 0-x of the USS or the number of bits of the DCI format 1-x of the USS is larger than the threshold value, stopping detecting the DCI format 1-1 of the USS by the UE; and step f: enabling the number of bits of the DCI format 0-1 of the USS and the number of bits of the DCI format 1-1 of the USS to be the same by increasing or reducing the number of bits of the DCI format 0-1 or the number of bits of the DCI format 1-1 of the USS.

Alternatively, the bit number changing unit can determine the priority of the DCI format, and reduce the number of bits of the DCI format according to the determined priority.

Alternatively, a number of bits of a DCI format having a low priority is changed prior to a number of bits of a DCI format having a high priority, and when a number of the detected DCI format reaches a predetermined number after changing the number of bits of the DCI format, changing the number of bits of the DCI format is stopped, and/or, the priority of the DCI format is determined according to service types of a PDSCH and a PUSCH scheduled by the DCI having the DCI format, and/or a priority of a DCI format of a DCI that schedules the PDSCH or the PUSCH for URLLC data transmission is higher than a priority of a DCI format of a DCI that schedules the PDSCH or the PUSCH for the eMBB data transmission.

Alternatively, the apparatus further includes: a blind detection time adjusting unit which reduces a number of blind detections of each DCI format.

Alternatively, the blind detection time adjusting unit configured to: reduce the number of blind detections of the DCI based on a priority, wherein the priority, based on which the number of blind detections of the DCI format is reduced, is determined based on service types of the PDSCH and/or the PUSCH; and/or the PUSCH, and/or, a number of detections of the DCI format having a low priority is reduced prior to a number of blind detections of the DCI format having a high priority, and when a detection complexity of the DCI reaches a predetermined degree after the number of blind detections of the DCI format is reduced, reducing the number of blind detections of the DCI format is stopped; and/or, a priority of a DCI format of a DCI that schedules the PUSCH or the PDSCH for an URLLC data transmission is higher than a priority of a DCI format of a DCI that schedules the PUSCH or the PDSCH for the eMBB data transmission.

Alternatively, the detection time limiting unit configured to: when the UE configures a serving cell, or when the UE configures a CA or a DC, a maximum number of the serving cells supported by a CA ability or a DC ability of the UE is a predetermined number, and the predetermined number is larger than or equal to the number of the serving cells configured by the UE, determine a first correspondence between a sub-carrier spacing configuration of the PDCCH and a maximum number of detections of the PDCCH at each time slot in each serving cell configured by the UE and a second correspondence between the sub-carrier spacing configuration of the PDCCH and a maximum number of detections for the non-overlapped CCE at each time slot in each serving cell configured by the UE, and limit the number of detections of the PDCCH and the number of detections of the non-overlapped CCE according to the determined result.

Alternatively, the detection time limiting unit is configured to: when the UE configures the CA or the DC, the maximum number of the serving cells supported by the CA ability or the DC ability of the UE is a predetermined number, the predetermined number is smaller than or equal to a number $N_{cells}^{cap}$ of downlink serving cells indicated by the detection ability of the UE for detecting the PDCCH, and the UE configures $N_{cells}^{DL,\mu}$ downlink serving cells, according to the first correspondence, the second correspondence, the number $N_{cells}^{cap}$ of the downlink serving cells indicated by the detection ability and the number $N_{cells}^{DL,\mu}$ of the downlink serving cells configured by the UE, determine a sum of the maximum numbers of detections for the PDCCHs with different sizes at each time slot in $N_{cells}^{DL,\mu}$ downlink serving cells by the UE, and a sum of the maximum numbers of detections for the non-overlapped CCEs at each time slot in $N_{cells}^{DL,\mu}$ downlink serving cells by the UE, and limit the number of detections of the PDCCH and the number of detections of the non-overlapped CCE according to a result of the determination.

Alternatively, the detection time limiting unit is configured to: determine a third correspondence and a fourth correspondence according to the following operation, and limit the number of detections of the PDCCH and the number of detections of the non-overlapped CCE according to the determined correspondences: when the UE configures a serving cell that supports a URLLC service, determining the third correspondence between the maximum number of detections for the PDCCHs with different sizes at each time slot in the serving cell that supports the URLLC service and a sub-carrier spacing configuration of the PDCCH, and determining the fourth correspondence between the maximum number of detections for the non-overlapped CCE at each time slot in the serving cell that supports the URLLC service and the sub-carrier spacing configuration of the PDCCH.

Alternatively, the detection time limiting unit is configured to: when at least one of the following conditions is satisfied, as for the serving cell that does not support the URLLC service, determine, according to the first correspondence and the second correspondence, a maximum number of detections of the PDCCHs with different sizes and a maximum number of detections for the non-overlapped CCE at each time slot in the serving cell that does not support the URLLC service, and determine, according to the third correspondence and the fourth correspondence, a maximum number of detections of the PDCCHs with different sizes and a maximum number of detections for the non-overlapped CCE at each time slot in the serving cell that supports the URLLC service: Condition 1: the UE configures the CA or the DC, the UE supports the URLLC service, the CA ability or the DC ability of the UE at most supports a predetermined number of downlink serving cells, and the number of the serving cells that support the URLLC service configured by the UE is smaller than or equal to the predetermined number; Condition 2: the UE configures the CA or the DC, the UE supports the URLLC service, the CA ability or the DC ability of the UE at most supports a predetermined number of downlink serving cells, the number of the serving cells that support the URLLC service configured by the UE is smaller than a number s1, and the number s1 is smaller than or equal to the predetermined number; Condition 3: the UE configures the CA or the DC, the UE supports the URLLC service, the CA ability or the DC ability of the UE at most supports a predetermined number of downlink serving cells, the number of the serving cells that support the URLLC service configured by the UE is smaller than a number s1, the number of the serving cells that do not support the URLLC service configured by the UE is smaller than or equal to a number s2, the number s1 is smaller than or equal to the predetermined number, and the number s2 is smaller than or equal to the predetermined number; and Condition 4: the UE configures the CA or the DC, the UE supports the URLLC service, the CA ability or the DC ability of the UE at most supports a predetermined number of downlink serving cells, the number of the serving cells that support the URLLC service configured by the UE is h1, the number of the serving cells that do not support the URLLC service configured by the UE is h2, and h1×(1+alpha)+h2 or h1×alpha_1+h2 is smaller than or equal to the predetermined number, wherein alpha and alpha_1 are predetermined factors, respectively.

Alternatively, in the case where the UE configures the CA or the DC, the UE supports the URLLC service, the number of the downlink serving cells that are supported by the CA ability or the DC ability of the UE is more than a predetermined number, a PDCCH detection ability of the UE includes $N_{cells}^{cap}$ downlink serving cells, $N_{cells}^{cap}$ is larger than or equal to the predetermined number, and the UE configures $N_{cells}^{DL,\mu}$ downlink serving cells, the detection time limiting unit is configured to: determine a maximum number of detections through at least one of the following manners, and limit a corresponding number of detections according to a result of the determination: Manner 1: according to the first correspondence and the second correspondence, determining the maximum number of detections for the PDCCHs with different sizes at each time slot in each downlink serving cell, and the maximum number of detections for the non-overlapped CCE at each time slot in each downlink serving cell; Manner 2: according to the third correspondence and the fourth correspondence, determining the maximum number of detections for the PDCCHs with different sizes at each time slot in each downlink serving cell, and the maximum number of detections for the non-overlapped CCE at each time slot in each downlink serving cell; Manner 3: according to the first correspondence and the second correspondence, determining the maximum number of detections of the PDCCHs with different sizes at each time slot in each downlink serving cell that supports the URLLC service and the maximum number of detections for the non-overlapped CCE at each time slot in each downlink serving cell that supports the URLLC service, and according to the third correspondence and the fourth correspondence, determining the maximum number of detections of the PDCCHs with different sizes at each time slot in each downlink serving cell that does not support the URLLC service and the maximum number of detections for the non-overlapped CCE at each time slot in each downlink serving cell that does not support the URLLC service; Manner 4: according to the first correspondence and the third correspondence, determining the maximum number of detections of the PDCCHs with different sizes at each time slot in each downlink serving cell that does not introduce the URLLC service and each downlink serving cell that introduces the URLLC service, and according to the second correspondence and the fourth correspondence, determining the maximum number of detections for the non-overlapped CCE at each time slot in each downlink serving cell that does not introduce the URLLC service and each downlink serving cell that introduces the URLLC service; Manner 5: allocating, in a precedent sequence, a part of the PDCCH detection ability of the UE to the downlink serving cell that supports the URLLC service, based on a predetermined weight factor α, the part corresponding to the number of the downlink serving cells that support the URLLC service, the number being weighted through the weight factor α, and allocating an ability other than the part of the PDCCH detection ability of the UE to a rest downlink serving cell; and Manner 6: allocating, in a precedent sequence, a part of the PDCCH detection ability of the UE to the downlink serving cell that supports the URLLC service, based on the predetermined weight factor α1, the part corresponding to the number of the downlink serving cells that support the URLLC service, the number being weighted through the weight factor α1, and allocating an ability other than the part of the PDCCH detection ability of the UE to each downlink serving cell averagely.

According to an embodiment, a method of receiving Downlink Control Information (DCI), comprises determining, by a User Equipment (UE), a number of detections corresponding to a DCI detection ability of the UE and a number of detections corresponding to a DCI format; reducing, by the UE, the number of detections corresponding to the DCI format, wherein the reduced number of detections corresponding to the DCI format is smaller than or equal to the number of detections corresponding to the DCI detection ability; and receiving, by the UE, the DCI according to the reduced number of detections corresponding to the DCI format.

In some embodiments (e.g., one or more embodiments described above), the reducing the number of detections corresponding to the DCI format comprises: reducing a number of detected DCI formats with different numbers of bits by changing a number of bits of at least one DCI format, to remove the number of detections corresponding to the DCI format removed by changing the number of bits, and/or limiting a number of detections of a physical downlink control channel (PDCCH) and a number of detections of a non-overlapped control channel element (CCE).

In some embodiments (e.g., one or more embodiments described above), as for a serving cell that introduces an ultra reliable low latency communication (URLLC) service transmission, the reducing the number of the detected DCI formats with different numbers of bits comprises at least one step of: enabling a number of bits of a DCI format 0-0 of a common search space (CSS) and a number of bits of a DCI format 1-0 of the CSS to be the same by increasing or reducing the number of bits of the DCI format; enabling a number of bits of a DCI format 0-0 of a UE-specific search space (USS) and the number of bits of the DCI format 1-0 of the CSS to be the same by increasing or reducing the number of bits of the DCI format; when a number of bits of a DCI format 0-1 of the USS is the same as the number of bits of the DCI format 0-0 of the USS or a number of bits of a DCI format 1-0 of the USS, increasing the number of bits of the DCI format 0-1 of the USS by 1 bit, to enable the number of bits of the DCI format 0-1 of the USS to be different from the number of bits of the DCI format 0-0 of the USS or the number of bits of the DCI format 1-0 of the USS; when a number of bits of a DCI format 1-1 of the USS is the same as the number of bits of the DCI format 0-0 of the USS or the number of bits of the DCI format 1-0 of the USS, increasing the number of bits of the DCI format 1-1 of the USS by 1 bit, to enable the number of bits of the DCI format 1-1 of the USS to be different from the number of bits of the DCI format 0-0 of the USS or the number of bits of the DCI format 1-0 of the USS, when the number of the DCI formats with different numbers of bits detected in each serving cell by the UE is enabled, through the at least one step, to be smaller than or equal to M, and a number of the DCI formats with different numbers of bits scrambled with a cell radio network temporary indicator (C-RNTI) detected in the each serving cell by the UE is enabled, through the at least one step, to be smaller than or equal to N, then the reducing the number of the detected DCI formats with different numbers of bits is completed, and N≥4, and M≥3.

In some embodiments (e.g., one or more embodiments described above), as for the serving cell that introduces the URLLC service transmission, when the number of the DCI formats with different numbers of bits detected in each serving cell by the UE is not enabled to be smaller than or equal to M and the number of the DCI formats with different numbers of bits scrambled with the C-RNTI detected in the each serving cell by the UE is not enabled to be smaller than or equal to N, the following steps are performed in an order of step b, step c, step d, step e, step f and step a, until the number of the DCI formats with different numbers of bits detected in the each serving cell by the UE is smaller than or equal to M and the number of the DCI formats with different numbers of bits scrambled with the C-RNTI detected in the each serving cell by the UE is smaller than or equal to N, and N≥4, and M≥3: step a: enabling a number of bits of a DCI format 0-x of the USS and a number of bits of a DCI format 1-x of the USS to be the same by increasing or reducing the number of bits of the DCI format 0-x or the number of bits of the DCI format 1-x; step b: enabling the number of bits of the DCI format 0-1 of the USS and the number of bits of the DCI format 0-x of the USS or the number of bits of the DCI format 1-x of the USS to be the same by increasing or reducing the number of bits of the DCI format 0-1; step c: enabling the number of bits of the DCI format 1-1 of the USS and the number of bits of the DCI format 0-x of the USS or the number of bits of the DCI format 1-x of the USS to be the same by increasing or reducing the number of bits of the DCI format 1-1; step d: when a difference between the number of bits of the DCI format 0-1 of the USS and the number of bits of the DCI format 0-x of the USS or the number of bits of the DCI format 1-x of the USS is smaller or equal to a threshold value, enabling the number of bits of the DCI format 0-1 of the USS to be the same as the number of bits of the DCI format 0-x of the USS or the number of bits of the DCI format 1-x of the USS by increasing or reducing the number of bits of the DCI format 0-1 of the USS; and when a difference between the number of bits of the DCI format 0-1 of the USS and the number of bits of the DCI format 0-x of the USS or the number of bits of the DCI format 1-x of the USS is larger than the threshold value, stopping detecting the DCI format 0-1 of the USS by the UE; step e: when a difference between the number of bits of the DCI format 1-1 of the USS and the number of bits of the DCI format 0-x of the USS or the number of bits of the DCI format 1-x of the USS is smaller or equal to a threshold value, enabling the number of bits of the DCI format 1-1 of the USS to be the same as the number of bits of the DCI format 0-x of the USS or the number of bits of the DCI format 1-x of the USS by increasing or reducing the number of bits of the DCI format 1-1 of the USS; and when a difference between the number of bits of the DCI format 1-1 of the USS and the number of bits of the DCI format 0-x of the USS or the number of bits of the DCI format 1-x of the USS is larger than the threshold value, stopping detecting the DCI format 1-1 of the USS by the UE; and step f: enabling the number of bits of the DCI format 0-1 of the USS and the number of bits of the DCI format 1-1 of the USS to be the same by increasing or reducing the number of bits of the DCI format 0-1 of the USS or the number of bits of the DCI format 1-1 of the USS.

In some embodiments (e.g., one or more embodiments described above), the reducing the number of the detected DCI formats with different numbers of bits comprises: determining a priority of the DCI format; and reducing the number of bits of the DCI format according to the determined priority.

In some embodiments (e.g., one or more embodiments described above), a number of bits of a DCI format having a low priority is changed prior to a number of bits of a DCI format having a high priority, and when a number of the detected DCI formats reaches a predetermined number after changing the number of bits of the DCI format, the changing the number of bits of the DCI format is stopped, and/or the priority of the DCI format is determined according to service types of a physical downlink shared channel (PDSCH) and a physical uplink shared channel (PUSCH) scheduled by the DCI having the DCI format, and/or the priority of the DCI format of the DCI that schedules the PDSCH or the PUSCH for URLLC data transmission is higher than the priority of the DCI format of the DCI that schedules the PDSCH or the PUSCH for an enhanced mobile broadband (eMBB) data transmission.

In some embodiments (e.g., one or more embodiments described above), the reducing, by the UE, the number of detections corresponding to the DCI format comprises: reducing the number of detections corresponding to the DCI format based on a priority, the priority, based on which the number of detections of the DCI format is reduced, is determined based on service types of a physical downlink shared channel (PDSCH) and/or a physical uplink shared channel (PUSCH); and/or, a number of detections of the DCI format having a low priority is reduced prior to a number of detections of the DCI format having a high priority, and when a detection complexity of the DCI reaches a predetermined degree after the number of detections of the DCI format is reduced, reducing the number of detections of the DCI format is stopped; and/or, the priority of the DCI format of the DCI that schedules the PUSCH or the PDSCH for an ultra reliable low latency communication (URLLC) data transmission is higher than the priority of the DCI format of the DCI that schedules the PUSCH or the PDSCH for an enhanced mobile broadband (eMBB) data transmission.

In some embodiments (e.g., one or more embodiments described above), the limiting the number of detections of the PDCCH and the number of detections of the non-overlapped CCE comprises: when the UE configures a serving cell, or when the UE configures a carrier aggregation (CA) or a dual connectivity (DC), a maximum number of the serving cells supported by a CA ability or a DC ability of the UE is a predetermined number, and the predetermined number is larger than or equal to the number of the serving cells configured by the UE, determining a first correspondence between a sub-carrier spacing configuration of the PDCCH and a maximum number of detections of the PDCCH at each time slot in each serving cell configured by the UE, and a second correspondence between the sub-carrier spacing configuration of the PDCCH and a maximum number of detections for the non-overlapped CCE at each time slot in each serving cell configured by the UE, and limiting the number of detections of the PDCCH and the number of detections of the non-overlapped CCE according to a result of the determining.

In some embodiments (e.g., one or more embodiments described above), the limiting the number of detections of the PDCCH and the number of detections of the non-overlapped CCE further comprises: when the UE configures the CA or the DC, the maximum number of the serving cells supported by the CA ability or the DC ability of the UE is a predetermined number, the predetermined number is smaller than or equal to a number $N_{cells}^{cap}$ of downlink serving cells indicated by the detection ability of the UE for detecting the PDCCH, and the UE configures $N_{cells}^{DL,\mu}$ downlink serving cells, according to the first correspondence, the second correspondence, the number $N_{cells}^{cap}$ of the downlink serving cells indicated by the detection ability, and the number $N_{cells}^{DL,\mu}$ of the downlink serving cells configured by the UE, determining a sum of the maximum numbers of detections for the PDCCHs with different sizes at each time slot in $N_{cells}^{DL,\mu}$ downlink serving cells by the UE, and a sum of the maximum numbers of detections for the non-overlapped CCEs at each time slot in $N_{cells}^{DL,\mu}$ downlink serving cells by the UE, and limiting the number of detections of the PDCCH and the number of detections of the non-overlapped CCE according to a result of the determining.

In some embodiments (e.g., one or more embodiments described above), the limiting the number of detections of the PDCCH and the number of detections of the non-overlapped CCE comprises determining a third correspondence and a fourth correspondence according to the following step, and limiting the number of detections of the PDCCH and the number of detections of the non-overlapped CCE according to the determined correspondences: when the UE configures a serving cell that supports a URLLC service, determining the third correspondence between the maximum number of detections for the PDCCHs with different sizes at each time slot in the serving cell that supports the URLLC service and a sub-carrier spacing configuration of the PDCCH, and determining the fourth correspondence between the maximum number of detections for the non-overlapped CCE at each time slot in the serving cell that supports the URLLC service and the sub-carrier spacing configuration of the PDCCH.

In some embodiments (e.g., one or more embodiments described above), the limiting the number of detections of the PDCCH and the number of detections of the non-overlapped CCE further comprises: when at least one of the following conditions is satisfied, as for the serving cell that does not support the URLLC service, determining, according to the first correspondence and the second correspondence, a maximum number of detections of the PDCCHs with different sizes and a maximum number of detections for the non-overlapped CCE at each time slot in the serving cell that does not support the URLLC service, and determining, according to the third correspondence and the fourth correspondence, a maximum number of detections of the PDCCHs with different sizes and a maximum number of detections for the non-overlapped CCE at each time slot in the serving cell that supports the URLLC service:

Condition 1: the UE configures the CA or the DC, the UE supports the URLLC service, the CA ability or the DC ability of the UE at most supports a predetermined number of downlink serving cells, and the number of the serving cells that support the URLLC service configured by the UE is smaller than or equal to the predetermined number;

Condition 2: the UE configures the CA or the DC, the UE supports the URLLC service, the CA ability or the DC ability of the UE at most supports a predetermined number of downlink serving cells, the number of the serving cells that support the URLLC service configured by the UE is smaller than a number s1, and the number s1 is smaller than or equal to the predetermined number;

Condition 3: the UE configures the CA or the DC, the UE supports the URLLC service, the CA ability or the DC ability of the UE at most supports a predetermined number of downlink serving cells, the number of the serving cells that support the URLLC service configured by the UE is smaller than a number s1, the number of the serving cells that do not support the URLLC service configured by the UE is smaller than or equal to a number s2, the number s1 is smaller than or equal to the predetermined number, and the number s2 is smaller than or equal to the predetermined number; and Condition 4: the UE configures the CA or the DC, the UE supports the URLLC service, the CA ability or the DC ability of the UE at most supports a predetermined number of downlink serving cells, the number of the serving cells that support the URLLC service configured by the UE is h1, the number of the serving cells that do not support the URLLC service configured by the UE is h2, and h1×(1+alpha)+h2 or h1×alpha_1+h2 is smaller than or equal to the predetermined number, alpha and alpha_1 are predetermined factors, respectively.

In some embodiments (e.g., one or more embodiments described above), the UE configures the CA or the DC, the UE supports the URLLC service, the number of the downlink serving cells that are supported by the CA ability or the DC ability of the UE is more than a predetermined number, a PDCCH detection ability of the UE comprises $N_{cells}^{cap}$ downlink serving cells, $N_{cells}^{cap}$ is larger than or equal to the predetermined number, and in the case where the UE configures $N_{cells}^{DL,\mu}$ downlink serving cells, the limiting the number of detections of the PDCCH and the number of detections of non-overlapped CCE further comprises determining the maximum number of detections through at least one of the following manners, and limiting a corresponding number of detections according to a result of the determining:

Manner 1: according to the first correspondence and the second correspondence, determining the maximum number of detections for the PDCCHs with different sizes at each time slot in each downlink serving cell, and the maximum number of detections for the non-overlapped CCE at each time slot in each downlink serving cell;

Manner 2: according to the third correspondence and the fourth correspondence, determining the maximum number of detections for the PDCCHs with different sizes at each time slot in each downlink serving cell, and the maximum number of detections for the non-overlapped CCE at each time slot in each downlink serving cell;

Manner 3: according to the first correspondence and the second correspondence, determining the maximum number of detections of the PDCCHs with different sizes at each time slot in each downlink serving cell that supports the URLLC service and the maximum number of detections for the non-overlapped CCE at each time slot in each downlink serving cell that supports the URLLC service, and according to the third correspondence and the fourth correspondence, determining the maximum number of detections of the PDCCHs with different sizes at each time slot in each downlink serving cell that does not support the URLLC service and the maximum number of detections for the non-overlapped CCE at each time slot in each downlink serving cell that does not support the URLLC service;

Manner 4: according to the first correspondence and the third correspondence, determining the maximum number of detections of the PDCCHs with different sizes at each time slot in each downlink serving cell that does not introduce the URLLC service and each downlink serving cell that introduces the URLLC service, and according to the second correspondence and the fourth correspondence, determining the maximum number of detections for the non-overlapped CCE at each time slot in each downlink serving cell that does not introduce the URLLC service and each downlink serving cell that introduces the URLLC service;

Manner 5: allocating, in a precedent sequence, a part of the PDCCH detection ability of the UE to the downlink serving cell that supports the URLLC service, based on a predetermined weight factor $\alpha$, the part corresponding to the number of the downlink serving cells that support the URLLC service, the number being weighted through the weight factor $\alpha$, and allocating an ability other than the part of the PDCCH detection ability of the UE to a rest downlink serving cell; and Manner 6: allocating, in a precedent sequence, a part of the PDCCH detection ability of the UE to the downlink serving cell that supports the URLLC service, based on the predetermined weight factor $\alpha 1$, the part corresponding to the number of the downlink serving cells that support the URLLC service, the number being weighted through the weight factor $\alpha 1$, and allocating an ability other than the part of the PDCCH detection ability of the UE to each downlink serving cell averagely.

According to an embodiment, an apparatus of receiving Downlink Control Information (DCI), comprising: a detection time determining unit, which determines a number of detections corresponding to a DCI detection ability of a user equipment (UE) and a number of detections corresponding to a DCI format; a detection time adjusting unit, which reduces the number of detections corresponding to the DCI format, the reduced number of detections corresponding to the DCI format is smaller than or equal to the number of detections corresponding to the DCI detection ability; and a DCI receiving unit, which receives the DCI according to the reduced number of detections corresponding to the DCI format.

According to an embodiment, a system comprising at least one computing device and at least one storage device storing an instruction, when the instruction is operated by the at least one computing device, the at least one computing device is enabled to perform the method of any one of embodiments describes above.

According to an embodiment, a computer readable storage medium storing an instruction, when the instruction is operated by at least one computing device, the at least one computing device is enabled to perform the method of any one of embodiments describes above.

According to another exemplary embodiment of the present disclosure, there is provided a computer readable storage medium stored therein with a computer program, wherein when the computer program is performed by a processor, the above described method is implemented.

According to another exemplary embodiment of the present disclosure, there is provided an electronic apparatus, wherein the electronic apparatus includes: a processor; and a storage stored with a computer program, wherein when the computer program is performed by a processor, the above described method is implemented.

The computer readable storage medium is any data storage device that can store the data read by the computer system. Examples of the computer readable recording medium include: a Read-Only Memory, a Random-Access Memory, a CD-Read Only Memory, a magnetic tape, a floppy disk, an optical data storage device and a carrier wave (such as a data transmission passing through a network via a wired or wireless transmission path).

In addition, it should be understood that respective units of the apparatuses (for example, the terminal and base station, etc.) according to the exemplary embodiment of the present disclosure can be implemented as hardware assembly and/or software assembly. According to the processes executed by each defined unit, those skilled in the art can use a field-programmable gate array (FPGA) or an application-specific integrated circuit (ASIC) to implement each unit.

In addition, the method according to the exemplary embodiment of the present disclosure can be implemented as a computer code in the computer readable storage medium. Those skilled in the art can implement the computer code according to the description for the above method. The above method of the present disclosure is implemented when the computer code is performed in the computer.

Although some exemplary embodiments of the present disclosure have been shown and described, those skilled in the art should understand that modifications may be made to these exemplary embodiments without departing from the principle and spirit of the present disclosure of which the scope is defined by the claims and equivalents thereof.

The invention claimed is:

1. A method performed by a user equipment (UE) in a wireless communication system, the method comprising:
transmitting, to a base station, capability information associated with a carrier aggregation, wherein the capability information includes first information indicating a first maximum number of a component carrier (CC) associated with a physical downlink control channel (PDCCH) monitoring;
receiving, from the base station, configuration information associated with downlink control information (DCI) formats;
executing a first step of a DCI size alignment, wherein the first step comprises aligning a size of a DCI format 0-x for an uplink scheduling with a size of a DCI format 1-x for a downlink scheduling, in case that a total number of different DCI sizes configured to monitor is more than four or a total number of different DCI sizes with a cell-radio network temporary identifier (C-RNTI) configured to monitor is more than three; and
executing a second step of the DCI size alignment, wherein the second step comprises aligning a size of a DCI format 0-1 for the uplink scheduling with a size of a DCI format 1-1 for the downlink scheduling, in case that, after the first step, a total number of different DCI sizes configured to monitor is more than four or a total number of different DCI sizes with a cell-radio network temporary identifier (C-RNTI) configured to monitor is more than three,
wherein the DCI format 0-x is different from the DCI format 0-1 and the DCI format 1-x is different from the DCI format 1-1.

2. The method of claim 1,
wherein the DCI format 0-x is used for an uplink scheduling associated with an ultra-reliable low latency communication (URLLC), and
wherein the DCI format 1-x is used for a downlink scheduling associated with an URLLC.

3. The method of claim 1, wherein the configuration information is received via higher layer signaling.

4. The method of claim 1,
wherein a total number of different DCI sizes configured to monitor is smaller than or equal to four based on the DCI size alignment, and
wherein a total number of different DCI sizes with the C-RNTI configured to monitor is smaller than or equal to three based on the DCI size alignment.

5. The method of claim 1,
wherein the capability information further includes second information indicating a second maximum number of a PDCCH monitoring for a first downlink cell and a third maximum number of a PDCCH monitoring for a second downlink cell, and
wherein the first downlink cell for the UE supports an ultra-reliable low latency communication (URLLC) and the second downlink cell for the UE does not support the URLLC.

6. A method performed by a base station in a wireless communication system, the method comprising:
receiving, from a user equipment (UE), capability information associated with a carrier aggregation, wherein the capability information includes first information indicating a first maximum number of a component carrier (CC) associated with a physical downlink control channel (PDCCH) monitoring;
transmitting, to the UE, configuration information associated with downlink control information (DCI) formats; and
transmitting, to the UE, DCI based on a DCI size alignment,
wherein a first step of the DCI size alignment is executed by aligning a size of a DCI format 0-x for an uplink scheduling with a size of a DCI format 1-x for a downlink scheduling, in case that a total number of different DCI sizes configured to monitor is more than four or a total number of different DCI sizes with a cell-radio network temporary identifier (C-RNTI) configured to monitor is more than three,
wherein a second step of the DCI size alignment is executed by aligning a size of a DCI format 0-1 for the uplink scheduling with a size of a DCI format 1-1 for the downlink scheduling, in case that, after the first step, a total number of different DCI sizes configured to monitor is more than four or a total number of different DCI sizes with a cell-radio network temporary identifier (C-RNTI) configured to monitor is more than three, and
wherein the DCI format 0-x is different from the DCI format 0-1 and the DCI format 1-x is different from the DCI format 1-1.

7. The method of claim 6,
wherein the DCI format 0-x is used for an uplink scheduling associated with for an ultra-reliable low latency communication (URLLC), and
wherein the DCI format 1-x is used for a downlink scheduling associated with an URLLC.

8. The method of claim 6, wherein the configuration information is transmitted via higher layer signaling.

9. The method of claim 6,
wherein a total number of different DCI sizes configured to monitor is smaller than or equal to four based on the DCI size alignment, and
wherein a total number of different DCI sizes with the C-RNTI configured to monitor is smaller than or equal to three based on the DCI size alignment.

10. The method of claim 6,
wherein the capability information further includes second information indicating a second maximum number of a PDCCH monitoring for a first downlink cell and a third maximum number of a PDCCH monitoring for a second downlink cell, and
wherein the first downlink cell for the UE supports an ultra-reliable low latency communication (URLLC) and the second downlink cell for the UE does not support the URLLC.

11. A user equipment (UE) in a wireless communication system, comprising:
a transceiver; and
a controller coupled with the transceiver, and configured to:
transmit, to a base station, capability information associated with a carrier aggregation, wherein the capability information includes first information indicating a first maximum number of a component carrier (CC) associated with a physical downlink control channel (PDCCH) monitoring,
receive, from the base station, configuration information associated with downlink control information (DCI) formats,
execute a first step of a DCI size alignment, wherein the first step comprises aligning a size of a DCI format 0-x for an uplink scheduling with a size of a DCI format 1-x for a downlink scheduling, in case that a total number of different DCI sizes configured to monitor is more than four or a total number of different DCI sizes with a cell-radio network temporary identifier (C-RNTI) configured to monitor is more than three, and
execute a second step of the DCI size alignment, wherein the second step comprises aligning a size of a DCI format 0-1 for the uplink scheduling with a size of a DCI format 1-1 for the downlink scheduling, in case that, after the first step, a total number of different DCI sizes configured to monitor is more than four or a total number of different DCI sizes with a cell-radio network temporary identifier (C-RNTI) configured to monitor is more than three,
wherein the DCI format 0-x is different from the DCI format 0-1 and the DCI format 1-x is different from the DCI format 1-1.

12. The UE of claim 11,
wherein the DCI format 0-x is used for an uplink scheduling associated with an ultra-reliable low latency communication (URLLC), and
wherein the DCI format 1-x is used for a downlink scheduling associated with an URLLC.

13. The UE of claim 11, wherein the configuration information is received via higher layer signaling.

14. The UE of claim 11,
wherein a total number of different DCI sizes configured to monitor is smaller than or equal to four based on the DCI size alignment, and
wherein a total number of different DCI sizes with the C-RNTI configured to monitor is smaller than or equal to three based on the DCI size alignment.

15. The UE of claim 11,
wherein the capability information further includes second information indicating a second maximum number of a PDCCH monitoring for a first downlink cell and a third maximum number of a PDCCH monitoring for a second downlink cell, and
wherein the first downlink cell for the UE supports an ultra-reliable low latency communication (URLLC) and the second downlink cell for the UE does not support the URLLC.

16. A base station in a wireless communication system, comprising:
a transceiver; and
a controller coupled with the transceiver, and configured to:
receive, from a user equipment (UE), capability information associated with a carrier aggregation, wherein the capability information includes first information indicating a first maximum number of a component carrier (CC) associated with a physical downlink control channel (PDCCH) monitoring,
transmit, to the UE, configuration information associated with downlink control information (DCI) formats, and
transmit, to the UE, DCI based on a DCI size alignment,
wherein a first step of the DCI size alignment is executed by aligning a size of a DCI format 0-x for an uplink scheduling with a size of a DCI format 1-x for a downlink scheduling, in case that a total number of different DCI sizes configured to monitor is more than four or a total number of different DCI sizes with a cell-radio network temporary identifier (C-RNTI) configured to monitor is more than three,
wherein a second step of the DCI size alignment is executed by aligning a size of a DCI format 0-1 for the uplink scheduling with a size of a DCI format 1-1 for the downlink scheduling, in case that, after the first step, a total number of different DCI sizes configured to monitor is more than four or a total number of different DCI sizes with a cell-radio network temporary identifier (C-RNTI) configured to monitor is more than three, and
wherein the DCI format 0-x is different from the DCI format 0-1 and the DCI format 1-x is different from the DCI format 1-1.

17. The base station of claim 16,
wherein the DCI format 0-x is used for an uplink scheduling associated with for an ultra-reliable low latency communication (URLLC), and
wherein the DCI format 1-x is used for a downlink scheduling associated with an URLLC.

18. The base station of claim 16, wherein the configuration information is transmitted via higher layer signaling.

19. The base station of claim 16,
wherein a total number of different DCI sizes configured to monitor is smaller than or equal to four based on the DCI size alignment, and
wherein a total number of different DCI sizes with the C-RNTI configured to monitor is smaller than or equal to three based on the DCI size alignment.

20. The base station of claim 16,
wherein the capability information further includes second information indicating a second maximum number of a PDCCH monitoring for a first downlink cell and a third maximum number of a PDCCH monitoring for a second downlink cell, and
wherein the first downlink cell for the UE supports an ultra-reliable low latency communication (URLLC) and the second downlink cell for the UE does not support the URLLC.

* * * * *